United States Patent
Chen et al.

(10) Patent No.: US 9,165,219 B2
(45) Date of Patent: Oct. 20, 2015

(54) IMAGE DISTORTION CORRECTION METHOD AND IMAGE DISTORTION CORRECTION DEVICE USING THE SAME

(71) Applicant: National Central University, Taoyuan County (TW)

(72) Inventors: Ching-Han Chen, Taoyuan County (TW); Tun-Kai Yao, Kaohsiung (TW)

(73) Assignee: NATIONAL CENTRAL UNIVERSITY, Taoyuan County (TW)

( * ) Notice: Subject to any disclaimer, the term of this patent is extended or adjusted under 35 U.S.C. 154(b) by 0 days.

(21) Appl. No.: 14/175,227

(22) Filed: Feb. 7, 2014

(65) Prior Publication Data
US 2015/0063685 A1 Mar. 5, 2015

(30) Foreign Application Priority Data
Aug. 30, 2013 (TW) .............................. 102131358 A

(51) Int. Cl.
*G06K 9/66* (2006.01)
*G06T 5/00* (2006.01)

(52) U.S. Cl.
CPC . *G06K 9/66* (2013.01); *G06T 5/001* (2013.01); *G06T 2207/10004* (2013.01); *G06T 2207/20084* (2013.01)

(58) Field of Classification Search
CPC ........ H04N 5/3572; G06K 9/66; G06T 5/005; G06T 5/006
See application file for complete search history.

(56) References Cited

U.S. PATENT DOCUMENTS 5,617,490 A * 4/1997 Kume et al. .................. 382/275
6,671,400 B1 * 12/2003 Ekpar et al. .................. 382/157

* cited by examiner

*Primary Examiner* — Siamak Harandi
(74) *Attorney, Agent, or Firm* — WPAT, PC; Justin King

(57) ABSTRACT

An image distortion correction method and an image distortion correction device are provided. The image distortion correction method uses a neural network model to perform a correcting operation on an original image so as to obtain a correction image with plural correction points. Firstly, a position coordinate of the correction point is inputted into the neural network model, so that a first direction coordinate correction amount is outputted from the neural network model. Then, the position coordinate of the correction point is inputted into the neural network model, so that a second direction coordinate correction amount is outputted from the neural network model. Afterwards, a pixel value of the original image corresponding to the first direction coordinate correction amount and the second direction coordinate correction amount is used as a pixel value of the correction point.

45 Claims, 18 Drawing Sheets

IMAGE DISTORTION CORRECTION METHOD AND IMAGE DISTORTION CORRECTION DEVICE USING THE SAME

FIELD OF THE INVENTION

The present invention relates to an image processing method, and more particularly to an image distortion correction method.

BACKGROUND OF THE INVENTION

With increasing development of science and technology, electronic devices in image applications become more popular. For example, image pickup devices such as web cameras, reversing vehicle cameras, door viewers or cameras are widely used to facilitate various needs of human lives. However, the image captured by the image pickup device is usually suffered from distortion to a certain extent. The distortion image is not pleasing to the user.

Generally, there are three main causes of the distortion image. Firstly, since the camera module comprises a multi-piece lens group, the light beam should be refracted many times along the optical path from the entrance to the image sensor. Under this circumstance, the distortion image is generated. Secondly, if the assembling quality of the image pickup device is deteriorated, the camera module and the image sensor are not in parallel with each other, and the multiple lenses of the camera module are not in parallel with each other. Since the center of the image sensor and the centers of the multiple lenses are not arranged along the same optical axis, the image is suffered from distortion. Thirdly, if the manufacturing error is high, especially for the low prince camera module, the image is readily suffered from distortion.

For solving the above drawbacks, various polynomial correction methods are used to correct the distortion image that is obtained by the image pickup device. In accordance with the concepts of the polynomial correction method, a basic geometric distortion pattern (e.g. a translation pattern, a scaling pattern, a rotation pattern, an affine pattern, a partial twisting pattern or a bending pattern) is mathematically modeled as a distortion polynomial. After the coefficients of the distortion polynomial are estimated, the distortion image can be geometrically corrected. However, if the distortion image is caused by two or more geometric distortion patterns (e.g. a combination of a partial twisting pattern and a scaling pattern), plural geometric distortion patterns should be mathematically modeled, and then the distortion image can be sequentially and geometrically corrected.

However, the use of mathematical modeling approach to compensate and correct the distortion image is only able to correct the ideal curvy distortion surface. In practice, since too many unexpected factors influence the assembling process of the image pickup device, the assembling process of the camera module and the fabricating process of the lens, the distortion image is not usually the ideal curvy distortion surface. In other words, the efficacy of correcting the distortion image is usually unsatisfied.

Recently, an image distortion correction method based on artificial intelligence has been disclosed. This image distortion correction method uses a neural network to describe the relationship between the distortion image and a standard image (i.e. an accurate non-distortion image) and train various parameters of the neural network. After the relationship between the distortion image and the standard image is established, the distortion image is corrected accordingly. In particular, for obtaining the pixel value of any point of the correction image (i.e. the image corrected from the distortion image), after the planar coordinate of this point is inputted into the neural network, the neural network may correspondingly output another planar coordinate. According to the outputted planar coordinate, the pixel value of this point may be obtained from the distortion image. The above technology of using the neural network to correct the distortion image is well known to those skilled in the art, and is not redundantly described herein.

Especially, the neural network is constructed according to the overall behaviors of various image distortion parameters. Consequently, it is not necessary to search the factors influencing the image distortion from the image pickup device and successively compensate the factors. Of course, it is not necessary to consider how to deal with the problem of resulting in the non-ideal curvy distortion surface. However, there are still some drawbacks. For example, since the neural network needs a very huge computing amount, a great number of neurons are required to construct the neural network. In other words, the fabricating cost is high.

Therefore, there is a need of providing an improved image distortion correction method in order to obviate the above drawbacks.

SUMMARY OF THE INVENTION

The present invention relates to an image distortion correction method, and more particularly to an image distortion correction method based on a neural network model.

The present invention also relates to an image distortion correction device, and more particularly to an image distortion correction device using the image distortion correction method of the present invention.

In accordance with an aspect of the present invention, there is provided an image distortion correction method. The image distortion correction method includes the following steps. Firstly, in a step (1), a standard picture and a target image are provided. The standard picture has plural standard points, and the target image has plural target points corresponding to the plural standard points. In a step (2), a position coordinate of each standard point and a first direction coordinate change amount which is between each standard point and the corresponding target point are provided to the neural network model so as to train and obtain a first direction parameter group of the neural network model, and the position coordinate of each standard point and a second direction coordinate change amount which is between each standard point and the corresponding target point are provided to the neural network model so as to train and obtain a second direction parameter group of the neural network model. Afterwards, in a step (3), a correcting process is performed to correct distortion of an original image by the neural network model according to the first direction parameter group and the second direction parameter group of the neural network model, so that a correction image is obtained.

In an embodiment, in the step (1), the target image is obtained by using an image pickup device to shoot the standard picture. Moreover, in the step (3), the original image is captured by the image pickup device.

In an embodiment, the correction image includes at least one correction point. Moreover, the step (3) includes the following sub-steps. In a sub-step (3-1), a position coordinate of the at least one correction point is inputted into the neural network model, so that a first direction coordinate correction amount is outputted from the neural network model according to the first direction parameter group. After the first direction coordinate correction amount and the position coordinate of the at least one correction point are added together, a first direction sum coordinate is obtained. In a sub-step (3-2), the position coordinate of the at least one correction point is inputted into the neural network model, so that a second direction coordinate correction amount is outputted from the neural network model according to the second direction parameter group. After the second direction coordinate correction amount and the position coordinate of the at least one correction point are added together, a second direction sum coordinate is obtained. In the sub-step (3-3), a pixel value of the original image corresponding to the first direction sum coordinate and the second direction sum coordinate is used as a pixel value of the at least one correction point.

In an embodiment, preferably, in the step (3-3), the pixel value of the original image corresponding to the first direction sum coordinate and the second direction sum coordinate is obtained by interpolating pixel values of plural neighboring points around the first direction sum coordinate and the second direction sum coordinate of the original image.

In an embodiment, the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively. Alternatively, the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

In an embodiment, the neural network model includes an input layer, a hidden layer and an output layer, and the hidden layer includes plural neurons. A transfer function of each neuron of the hidden layer is a non-linear function. The first direction parameter group includes a first horizontal direction coordinate weight, a first vertical direction coordinate weight and a first direction bias value corresponding to at least one neuron of the hidden layer. The second direction parameter group includes a second horizontal direction coordinate weight, a second vertical direction coordinate weight and a second direction bias value corresponding to the at least one neuron of the hidden layer.

In an embodiment, the hidden layer includes four neurons.

In accordance with another aspect of the present invention, there is provided an image distortion correction method for using a neural network model to perform a correcting operation on an original image so as to obtain a correction image with at least one correction point. The image distortion correction method includes the following steps. In a step (1), a position coordinate of the at least one correction point is inputted into the neural network model so as to allow the neural network model to output a first direction correction point parameter, and the position coordinate of the at least one correction point is inputted into the neural network model so as to allow the neural network model to output a second direction correction point parameter. In a step (2), a pixel value of the original image corresponding to the first direction correction point parameter and the second direction correction point parameter is used as a pixel value of the at least one correction point.

In an embodiment, the first direction correction point parameter is a first direction coordinate correction amount, and the second direction correction point parameter is a second direction coordinate correction amount.

In an embodiment, a first direction sum coordinate is obtained after the first direction coordinate correction amount and the position coordinate of the at least one correction point are added together, and a second direction sum coordinate is obtained after the second direction coordinate correction amount and the position coordinate of the at least one correction point are added together. Moreover, in the step (2), a pixel value of the original image corresponding to the first direction sum coordinate and the second direction sum coordinate is used as the pixel value of the at least one correction point.

In the step (2), the pixel value of the original image corresponding to the first direction sum coordinate and the second direction sum coordinate is obtained by interpolating pixel values of plural neighboring points around the first direction sum coordinate and the second direction sum coordinate of the original image.

In an embodiment, the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively. Alternatively, the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

In an embodiment, the neural network model includes an input layer, a hidden layer and an output layer, and the hidden layer includes plural neurons. A transfer function of each neuron of the hidden layer is a non-linear function. The first direction correction point parameter is outputted from the neural network model at least according to a first direction parameter group corresponding to at least one neuron of the hidden layer. The second direction correction point parameter is outputted from the neural network model at least according to a second direction parameter group corresponding to the at least one neuron of the hidden layer. The first direction parameter group includes a first horizontal direction coordinate weight, a first vertical direction coordinate weight and a first direction bias value. The second direction parameter group includes a second horizontal direction coordinate weight, a second vertical direction coordinate weight and a second direction bias value.

In an embodiment, the hidden layer includes four neurons.

In accordance with another aspect of the present invention, there is provided an image distortion correction method for using a neural network model to perform a correcting operation on an original image so as to obtain a correction image with at least one correction point. The image distortion correction method includes the following steps. In a step (1), a position coordinate of the at least one correction point is inputted into the neural network model so as to allow the neural network model to output a coordinate correction amount, and an arithmetic operation is performed on the coordinate correction amount and the position coordinate of the at least one correction point so as to obtain an arithmetic coordinate. In a step (2), a pixel value of the original image corresponding to the arithmetic coordinate is used as a pixel value of the at least one correction point.

In the step (2), the pixel value of the original image corresponding to the arithmetic coordinate is obtained by interpolating pixel values of plural neighboring points around the arithmetic coordinate of the original image.

In an embodiment, the arithmetic operation is an addition operation, and the arithmetic coordinate is a sum coordinate.

In an embodiment, the step (1) includes a sub-step (1-1) of inputting the position coordinate of the at least one correction point into the neural network model so as to allow the neural network model to output a first direction coordinate correction amount, and inputting the position coordinate of the at least one correction point into the neural network model so as to allow the neural network model to output a second direction coordinate correction amount. Moreover, a first direction sum coordinate is obtained after the first direction coordinate correction amount and the position coordinate of the at least one correction point are added together, and a second direction sum coordinate is obtained after the second direction coordinate correction amount and the position coordinate of the at least one correction point are added together. In the step (2), a pixel value of the original image corresponding to the first direction sum coordinate and the second direction sum coordinate is used as the pixel value of the at least one correction point.

In an embodiment, the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively. Alternatively, the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

In an embodiment, the neural network model includes an input layer, a hidden layer and an output layer, and the hidden layer includes plural neurons. A transfer function of each neuron of the hidden layer is a non-linear function. The first direction coordinate correction amount is outputted from the neural network model at least according to a first direction parameter group corresponding to at least one neuron of the hidden layer. The second direction coordinate correction amount is outputted from the neural network model at least according to a second direction parameter group corresponding to the at least one neuron of the hidden layer. The first direction parameter group includes a first horizontal direction coordinate weight, a first vertical direction coordinate weight and a first direction bias value. The second direction parameter group includes a second horizontal direction coordinate weight, a second vertical direction coordinate weight and a second direction bias value.

In an embodiment, the hidden layer includes four neurons.

In accordance with another aspect of the present invention, there is provided an image distortion correction device for performing a correcting operation on an original image so as to obtain a correction image with plural correction points. The image distortion correction device includes a data storage and control unit, a neural network computing unit, and a pixel value computing unit. The data storage and control unit is used for obtaining a position coordinate of each correction point, a first direction parameter group and a second direction parameter group. The neural network computing unit is connected with the data storage and control unit for generating and outputting a first direction correction point parameter of each correction point according to the position coordinate of each correction point and the first direction parameter group, and generating and outputting a second direction correction point parameter of each correction point according to the position coordinate of each correction point and the second direction parameter group. The pixel value computing unit is connected with the neural network computing unit for obtaining a pixel value of each correction point from the original image according to the first direction correction point parameter and the second direction correction point parameter of each correction point.

In an embodiment, the first direction correction point parameter is a first direction coordinate correction amount, and the second direction correction point parameter is a second direction coordinate correction amount.

In an embodiment, a first direction sum coordinate is obtained after the first direction coordinate correction amount and the position coordinate of each correction point are added together, and a second direction sum coordinate is obtained after the second direction coordinate correction amount and the position coordinate of each correction point are added together. Moreover, the pixel value of each correction point is obtained from the original image by the pixel value computing unit according to the first direction sum coordinate and the second direction sum coordinate of each correction point.

In an embodiment, the pixel value computing unit includes an interpolation unit for interpolating pixel values of plural neighboring points around the first direction sum coordinate and the second direction sum coordinate of the original image, thereby obtaining the pixel value of each correction point.

In an embodiment, the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively. Alternatively, the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

In an embodiment, the neural network computing unit includes plural hidden layer neuron computing units. Each of the hidden layer neuron computing unit includes an input computing unit and a transfer function computing unit. The first direction parameter group includes a first horizontal direction coordinate weight, a first vertical direction coordinate weight and a first direction bias value corresponding to at least one hidden layer neuron computing unit of the neural network computing unit. The second direction parameter group includes a second horizontal direction coordinate weight, a second vertical direction coordinate weight and a second direction bias value corresponding to the at least one hidden layer neuron computing unit of the neural network computing unit.

In an embodiment, the input computing unit is an index computing unit, and the transfer function computing unit is a non-linear function computing unit. After the position coordinate of each correction point is received by the index computing unit, the index computing unit generates and outputs an index value to the non-linear function computing unit. Alternatively, the plural hidden layer neuron computing units include four hidden layer neuron computing units, or the plural hidden layer neuron computing units include four first direction hidden layer neuron computing units and four second direction hidden layer neuron computing units.

In an embodiment, the non-linear function computing unit includes an integer index function computing unit, a decimal fraction index function computing unit, and a multiplication and integration computing unit connected with the integer index function computing unit and the decimal fraction index function computing unit. The index value is divided into an integer index value and a decimal fraction index value. The integer index function computing unit receives the integer index value and generates an integer index function value. The decimal fraction index function computing unit receives the decimal fraction index value and generates a decimal fraction index function value. The multiplication and integration computing unit receives the integer index function value and the decimal fraction index function value and generates a product of the integer index function value and the decimal fraction index function value.

In an embodiment, the integer index function computing unit has an integer index function table. After the integer index value is received by the integer index function computing unit, the integer index function computing unit generates and outputs the integer index function value according to the coordinate rotation table.

In an embodiment, the decimal fraction index function computing unit includes a coordinate rotation digital computer (CORDIC) for performing an index computation after the decimal fraction index value is received by the decimal fraction index function computing unit. Alternatively, the decimal fraction index function computing unit has a decimal fraction index function table, and the decimal fraction index function computing unit generates and outputs the decimal fraction index function value according to the decimal fraction index function table after the decimal fraction index value is received by the decimal fraction index function computing unit. Alternatively, the decimal fraction index function computing unit generates and outputs the decimal fraction index function value according to a Taylor series expansion after the decimal fraction index value is received by the decimal fraction index function computing unit. Alternatively, the decimal fraction index function computing unit has the decimal fraction index function table, and the decimal fraction index function computing unit generates and outputs the decimal fraction index function value according to the decimal fraction index function table and the Taylor series expansion after the decimal fraction index value is received by the decimal fraction index function computing unit. Alternatively, the decimal fraction index function computing unit includes the coordinate rotation digital computer (CORDIC) and the decimal fraction index function table, and the decimal fraction index function computing unit generates and outputs the decimal fraction index function value according to the index computation of the coordinate rotation digital computer (CORDIC) and the decimal fraction index function table.

In an embodiment, if the decimal fraction index value is smaller than a predetermined value, the coordinate rotation digital computer performs the index computation to obtain the decimal fraction index function value. Whereas, if the decimal fraction index value is larger than the predetermined value, the decimal fraction index function computing unit generates and outputs the decimal fraction index function value according to the decimal fraction index function table.

In an embodiment, the image distortion correction device is included in an image pickup device or an image projection device, and/or the image distortion correction device is implemented by a field-programmable gate array (FPGA) or a very-large-scale integration (VLSI) circuit.

In accordance with another aspect of the present invention, there is provided an image distortion correction device for performing a correcting operation on an original image so as to obtain a correction image with plural correction points. The image distortion correction device includes a data storage and control unit, a neural network computing unit, an arithmetic computing unit, and a pixel value computing unit. The data storage and control unit is used for obtaining a position coordinate of each correction point and a direction parameter group. The neural network computing unit is connected with the data storage and control unit for generating and outputting a coordinate correction amount of each correction point according to the position coordinate of each correction point and the direction parameter group. The arithmetic computing unit is connected with the neural network computing unit for performing an arithmetic operation on the position coordinate of each correction point and the corresponding coordinate correction amount, thereby obtaining an arithmetic coordinate of each correction point. The pixel value computing unit is connected with the arithmetic computing unit for obtaining a pixel value of each correction point from the original image according to the arithmetic coordinate.

In an embodiment, the arithmetic operation is an addition operation, and the arithmetic coordinate is a sum coordinate.

In an embodiment, the direction parameter group includes a first direction parameter group and a second direction parameter group. The coordinate correction amount of each correction point includes a first direction coordinate correction amount and a second direction coordinate correction amount. The sum coordinate includes a first direction sum coordinate and a second direction sum coordinate. The neural network computing unit generates and outputs the first direction coordinate correction amount of each correction point according to the position coordinate of each correction point and the first direction parameter group, and generates and outputs a second direction coordinate correction amount of each correction point according to the position coordinate of each correction point and the second direction parameter group. The first direction sum coordinate is obtained after the first direction coordinate correction amount and the position coordinate of each correction point are added together. The second direction sum coordinate is obtained after the second direction coordinate correction amount and the position coordinate of each correction point are added together.

In an embodiment, the pixel value computing unit includes an interpolation unit for interpolating pixel values of plural neighboring points around the first direction sum coordinate and the second direction sum coordinate of the original image, thereby obtaining the pixel value of each correction point.

In an embodiment, the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively. Alternatively, the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

In an embodiment, the neural network computing unit includes plural hidden layer neuron computing units. Each of the hidden layer neuron computing unit includes an input computing unit and a transfer function computing unit. The first direction parameter group includes a first horizontal direction coordinate weight, a first vertical direction coordinate weight and a first direction bias value corresponding to at least one hidden layer neuron computing unit of the neural network computing unit. The second direction parameter group includes a second horizontal direction coordinate weight, a second vertical direction coordinate weight and a second direction bias value corresponding to the at least one hidden layer neuron computing unit of the neural network computing unit.

In an embodiment, the input computing unit is an index computing unit, and the transfer function computing unit is a non-linear function computing unit. After the position coordinate of each correction point is received by the index computing unit, the index computing unit generates and outputs an index value to the non-linear function computing unit. Alternatively, the plural hidden layer neuron computing units include four hidden layer neuron computing units, or the plural hidden layer neuron computing units include four first direction hidden layer neuron computing units and four second direction hidden layer neuron computing units.

In an embodiment, the non-linear function computing unit includes an integer index function computing unit, a decimal fraction index function computing unit, and a multiplication and integration computing unit connected with the integer index function computing unit and the decimal fraction index function computing unit. The index value is divided into an integer index value and a decimal fraction index value. The integer index function computing unit receives the integer index value and generates an integer index function value. The decimal fraction index function computing unit receives the decimal fraction index value and generates a decimal fraction index function value. The multiplication and integration computing unit receives the integer index function value and the decimal fraction index function value and generates a product of the integer index function value and the decimal fraction index function value.

In an embodiment, the integer index function computing unit has an integer index function table. After the integer index value is received by the integer index function computing unit, the integer index function computing unit generates and outputs the integer index function value according to the coordinate rotation table.

In an embodiment, the decimal fraction index function computing unit includes a coordinate rotation digital computer (CORDIC) for performing an index computation after the decimal fraction index value is received by the decimal fraction index function computing unit. Alternatively, the decimal fraction index function computing unit has a decimal fraction index function table, and the decimal fraction index function computing unit generates and outputs the decimal fraction index function value according to the decimal fraction index function table after the decimal fraction index value is received by the decimal fraction index function computing unit. Alternatively, the decimal fraction index function computing unit generates and outputs the decimal fraction index function value according to a Taylor series expansion after the decimal fraction index value is received by the decimal fraction index function computing unit. Alternatively, the decimal fraction index function computing unit has the decimal fraction index function table, and the decimal fraction index function computing unit generates and outputs the decimal fraction index function value according to the decimal fraction index function table and the Taylor series expansion after the decimal fraction index value is received by the decimal fraction index function computing unit. Alternatively, the decimal fraction index function computing unit includes the coordinate rotation digital computer (CORDIC) and the decimal fraction index function table, and the decimal fraction index function computing unit generates and outputs the decimal fraction index function value according to the index computation of the coordinate rotation digital computer (CORDIC) and the decimal fraction index function table.

In an embodiment, if the decimal fraction index value is smaller than a predetermined value, the coordinate rotation digital computer performs the index computation to obtain the decimal fraction index function value. Whereas, if the decimal fraction index value is larger than the predetermined value, the decimal fraction index function computing unit generates and outputs the decimal fraction index function value according to the decimal fraction index function table.

In an embodiment, the image distortion correction device is included in an image pickup device or an image projection device, and/or the image distortion correction device is implemented by a field-programmable gate array (FPGA) or a very-large-scale integration (VLSI) circuit.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
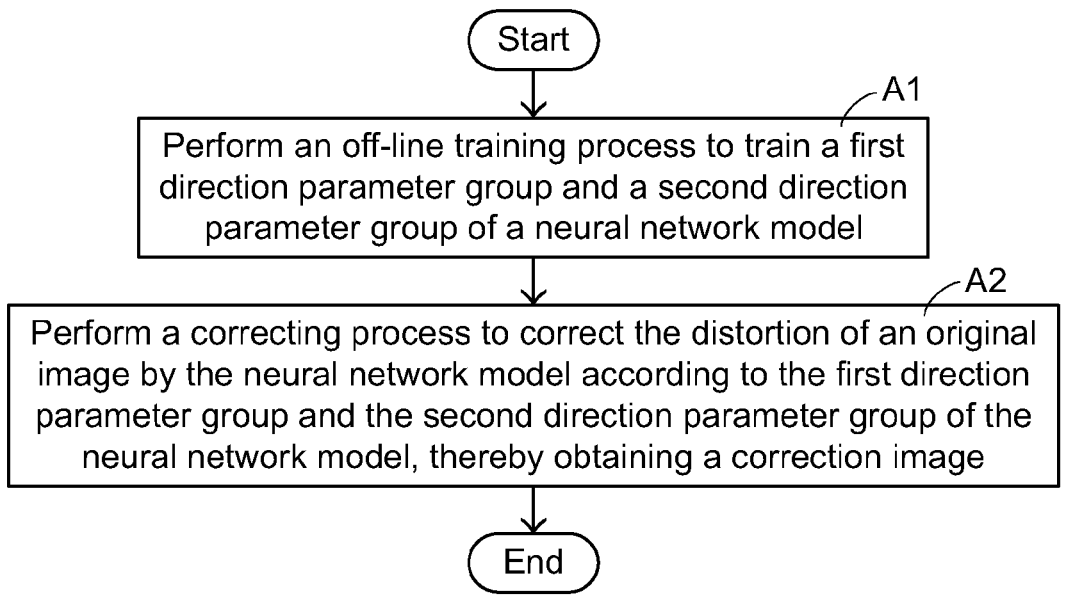
FIG. 1 is a flowchart illustrating an image distortion correction method according to an embodiment of the present invention.

FIG. 1 is a flowchart illustrating an image distortion correction method according to an embodiment of the present invention. The image distortion correction method uses a neural network model to correct distortion of an original image in order to obtain a correction image.

The image distortion correction method comprises the following steps. Firstly, in the step (A1), an off-line training process is performed to train a first direction parameter group and a second direction parameter group of the neural network model. Then, in the step (A2), a correcting process is performed to correct the distortion of an original image by the neural network model according to the first direction parameter group and the second direction parameter group of the neural network model, so that a correction image is obtained.

Figure 19:
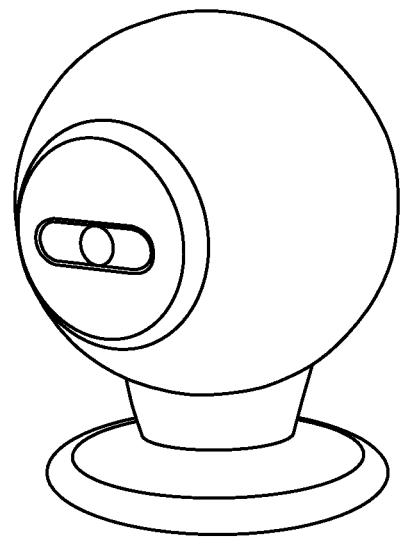
FIG. 19 schematically illustrates an image pickup device using the image distortion correction method of the present invention.

In this context, the original image indicates a distortion image captured by an image pickup device 9 (see FIG. 19), but is not limited thereto. Alternatively, the original image may be an image that is inputted into an image projection device and ready to be corrected and projected out from the image projection device.

Figure 2:
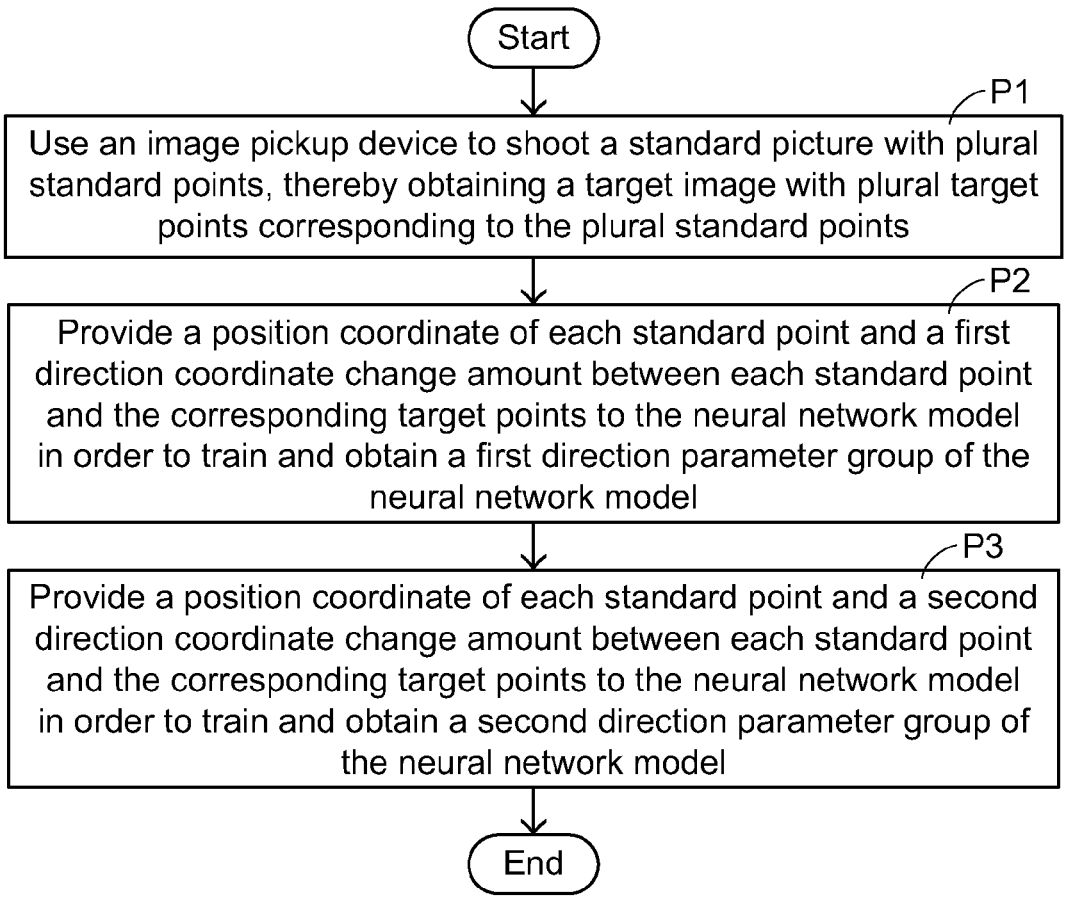
FIG. 2 is a flowchart illustrating an exemplary off-line training process of the image distortion correction method of FIG. 1.
Figure 3:
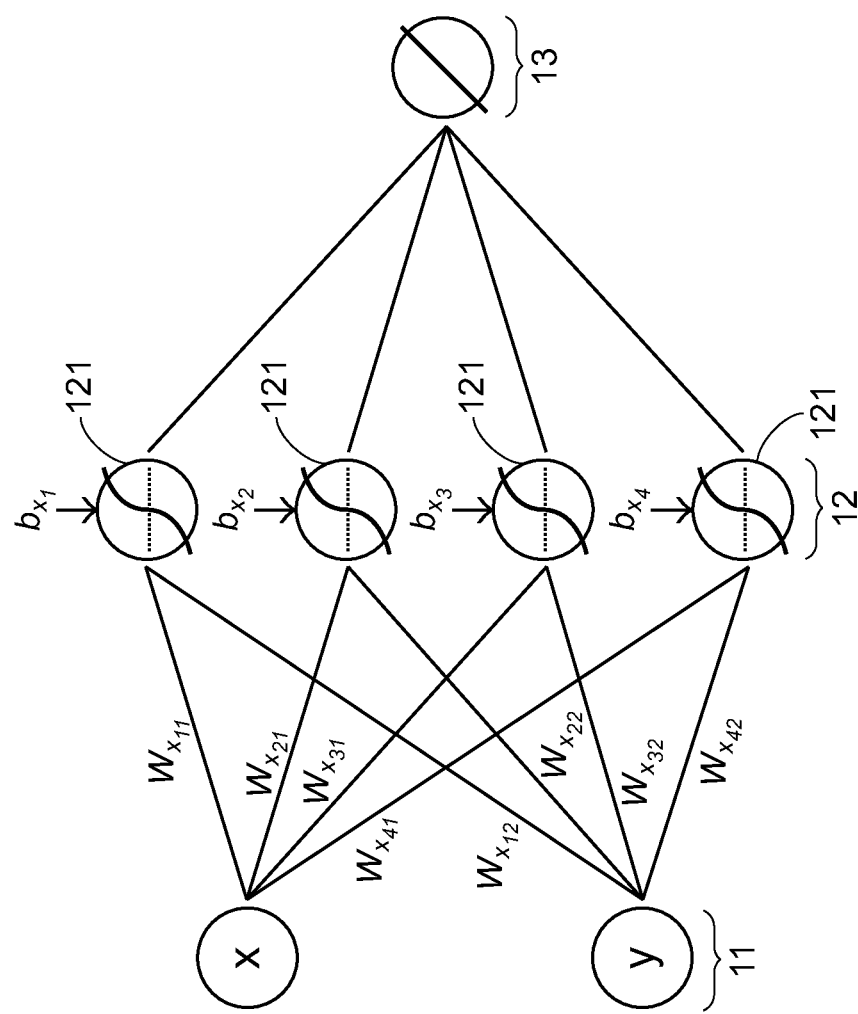
FIG. 3 schematically illustrates the architecture of a network model using the image distortion correction method of FIG. 1 and taken along a first direction.
Figure 4:
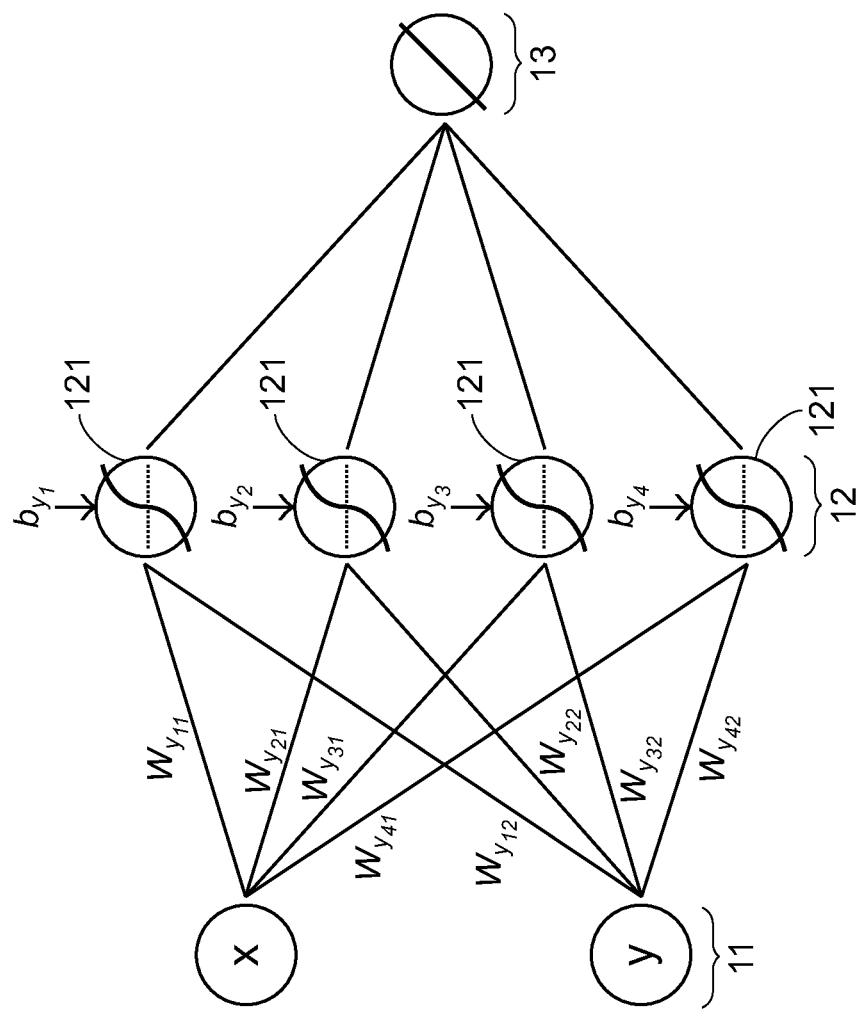
FIG. 4 schematically illustrates the architecture of a network model using the image distortion correction method of FIG. 1 and taken along a second direction.
Figure 5:
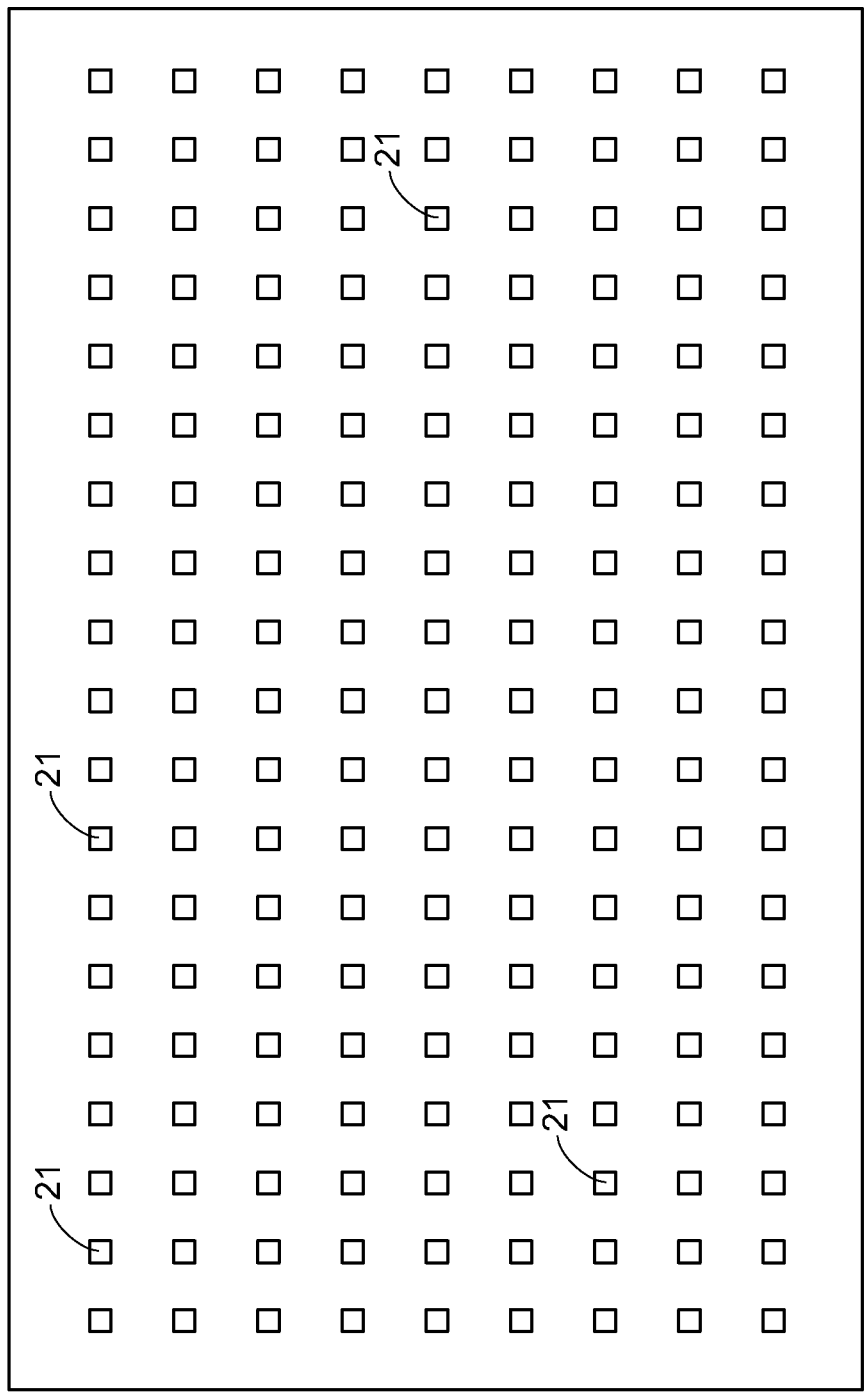
FIG. 5 schematically illustrates the concept of the standard picture as described in FIG. 2.
Figure 6:
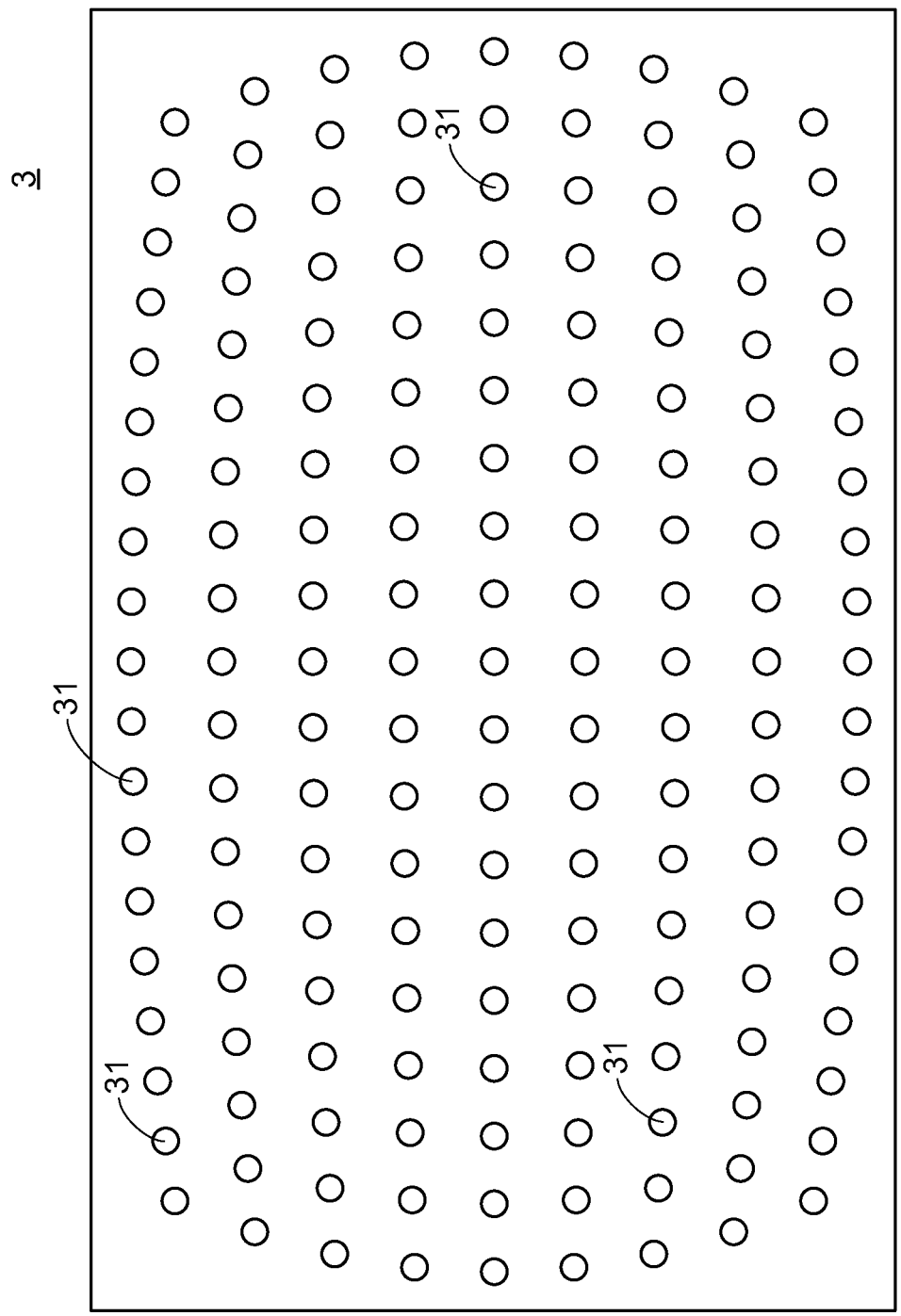
FIG. 6 schematically illustrates the concept of the target image as described in FIG. 2.
Figure 7:
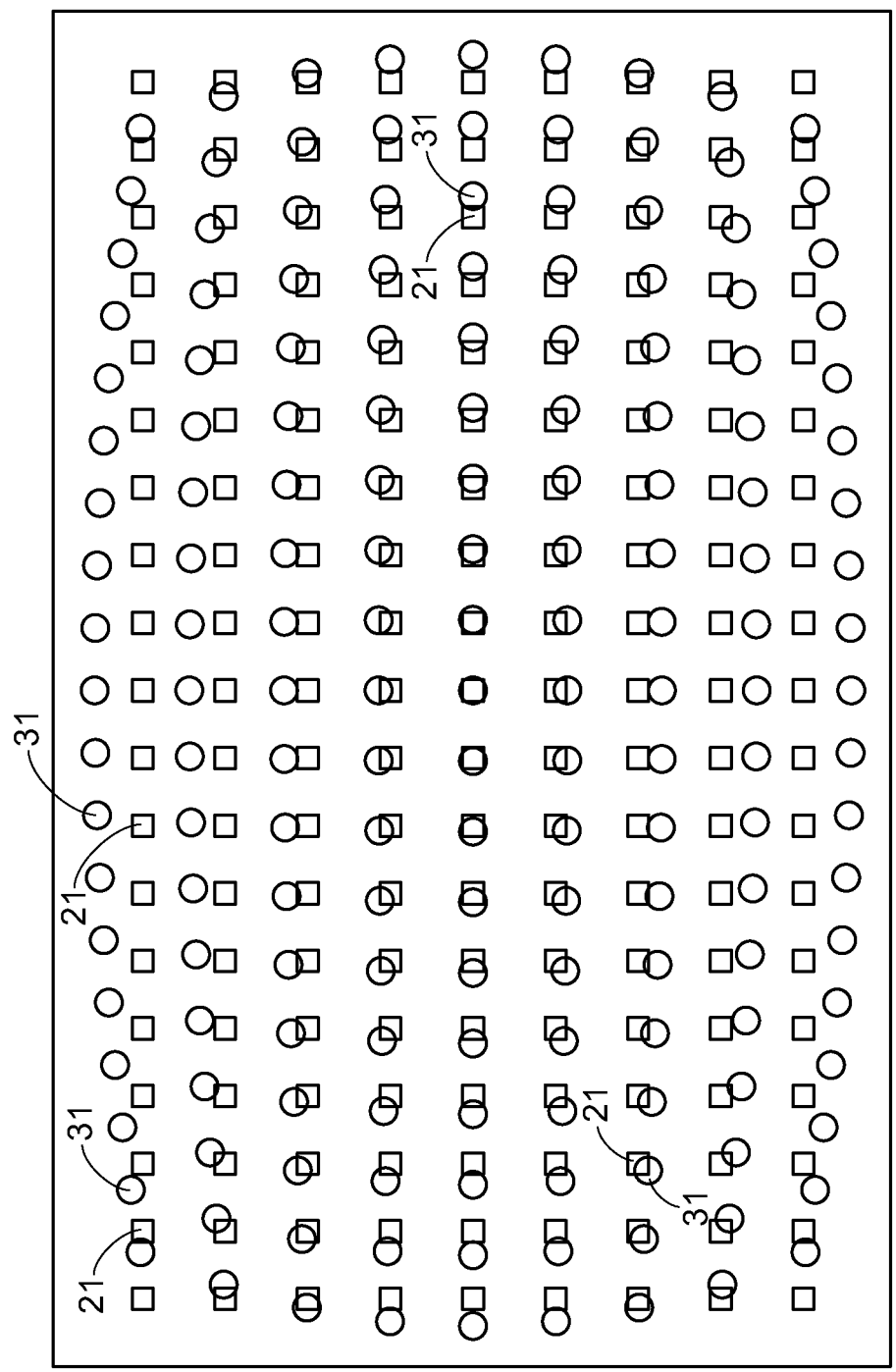
FIG. 7 schematically illustrates the relative positions between the standard point and plural corresponding target points as described in FIG. 2.

Please refer to FIGS. 2~7. FIG. 2 is a flowchart illustrating an exemplary off-line training process of the image distortion correction method of FIG. 1. FIG. 3 schematically illustrates the architecture of a network model using the image distortion correction method of FIG. 1 and taken along a first direction. FIG. 4 schematically illustrates the architecture of a network model using the image distortion correction method of FIG. 1 and taken along a second direction. FIG. 5 schematically illustrates the concept of the standard picture as described in FIG. 2. FIG. 6 schematically illustrates the concept of the target image as described in FIG. 2. FIG. 7 schematically illustrates the relative positions between the standard point and plural corresponding target points as described in FIG. 2.

In this embodiment, the neural network model is a network model consisting of three neural layers: an input layer 11, a hidden layer 12 and an output layer 13 sequentially. Especially, in this embodiment, the image distortion correction method may be implemented by using the hidden layer 12 with only four neurons 121. The number of the neurons 121 is presented herein for purpose of illustration and description only. It is noted that the number of the neurons 121 of the hidden layer 12 may be varied according to practical requirements.

The exemplary off-line training process of the image distortion correction method of the present invention comprises the following steps. In the step (P1), a standard picture 2 with plural standard points 21 is shot by the image pickup device 9, and thus a target image 3 with plural target points 31 corresponding to the plural standard points 21 is captured. Each of the number of the plural standard points 21 and the number of plural target points 31 is n1×n2. The position coordinates of the plural standard points 21 are $(x_{c1}, y_{c1})\sim(x_{cn1}, y_{cn2})$. The position coordinates of the plural target points 31 are $(x_{d1}, y_{d1})\sim(x_{dn1}, y_{dn2})$. In this embodiment, the standard picture 2 is formed on a calibration plate, but is not limited thereto. The way of acquiring the standard picture 2 and the target image 3 are presented herein for purpose of illustration and description only. In the step (P2), the coordinates $(x_{c1}, y_{c1})\sim(x_{cn1}, y_{cn2})$ of the plural standard points 21 and plural first direction coordinate change amounts $d_{x1}\sim d_{xn1}$ between the plural standard points 21 and respective target points 31 are provided to the neural network model in order to train and obtain the first direction parameter group $(W_{x11}, W_{x12}, b_{x1})$, $(W_{x21}, W_{x22}, b_{x2})$, $(W_{x31}, W_{x32}, b_{x3})$ and $(W_{x41}, W_{x42}, b_{x4})$ of the neural network model, wherein $d_{xi}=x_{di}-x_{ci}$, $i=1\sim n1$, $W_{x11}$, $W_{x21}$, $W_{x31}$ and $W_{x41}$ are first horizontal direction coordinate weights, $W_{x12}$, $W_{x22}$, $W_{x32}$ and $W_{x42}$ are first vertical direction coordinate weights, and $b_{x1}$, $b_{x2}$, $b_{x3}$ and $b_{x4}$ are first direction bias values. In the step (P3), the coordinates $(x_{c1}, y_{c1})\sim(x_{cn1}, y_{cn2})$ of the plural standard points 21 and plural second direction coordinate change amounts $d_{y1}\sim d_{yn1}$ between the plural standard points 21 and respective target points 31 are provided to the neural network model in order to train and obtain the second direction parameter group $(W_{y11}, W_{y12}, b_{y1})$, $(W_{y21}, W_{y22}, b_{y2})$, $(W_{y31}, W_{y32}, b_{y3})$ and $(W_{y41}, W_{y42}, b_{y4})$ of the neural network model, wherein $d_{yj}=y_{dj}-y_{cj}$, $j=1\sim n2$, $W_{y11}$, $W_{y21}$, $W_{y31}$ and $W_{y41}$ are second direction coordinate weights, $W_{y12}$, $W_{y22}$, $W_{y32}$ and $W_{y42}$ are second vertical direction coordinate weights, and $b_{y1}$, $b_{y2}$, $b_{y3}$ and $b_{y4}$ are second direction bias values.

In the step (P2) and FIG. 3, the coordinates $(x_{c1}, y_{c1})\sim(x_{cn1}, y_{cn2})$ of the plural standard points 21 are sequentially inputted into the input layer 11 of the neural network model, and then transmitted to the hidden layer 12. Moreover, a transfer function of each neuron 121 of the hidden layer 12 is a non-linear function. In a preferred embodiment, the transfer function of each neuron 121 of the hidden layer 12 is a sigmoid function. However, those skilled in the art will readily observe that other kinds of non-linear functions may be used in the image distortion correction method of the present invention according to the practical requirements.

In case that the coordinate $(x_c, y_c)$ is inputted into the input layer 11, the sigmoid function values $f(N_{x1})\sim f(N_{x4})$ are expressed by the following equation:

$$f(N_{xk}) = \frac{2}{1+e^{-\gamma N_{xk}}} - 1,$$
$$N_{xk} = \sum x_c W_{x_{k1}} + y_c W_{x_{k2}} + b_{xk},$$
$$k = 1\sim 4;$$

The sigmoid function values $f(N_{x1})\sim f(N_{x4})$ obtained by the neurons 121 of the hidden layer 12 are transmitted to the output layer 13. Then, the output values obtained by the output layer 13 and the first direction coordinate change amount $d_x$ corresponding to the position coordinate $(x_c, y_c)$ are compared with each other. According to the comparing result, the first direction parameter group $(W_{x11}, W_{x12}, b_{x1})$, $(W_{x21}, W_{x22}, b_{x2})$, $(W_{x31}, W_{x32}, b_{x3})$ and $(W_{x41}, W_{x42}, b_{x4})$ can be adjusted. Through sequentially inputting the coordinates $(x_{c1}, y_{c1})$~$(x_{cn1}, y_{cn2})$ of the plural standard points 21 into the neural network model repeatedly, the first direction parameter group $(W_{x11}, W_{x12}, b_{x1})$, $(W_{x21}, W_{x22}, b_{x2})$, $(W_{x31}, W_{x32}, b_{x3})$ and $(W_{x41}, W_{x42}, b_{x4})$ can be trained by the neural network model. After the training process is completed, appropriate values of the first direction parameter group $(W_{x11}, W_{x12}, b_{x1})$, $(W_{x21}, W_{x22}, b_{x2})$, $(W_{x31}, W_{x32}, b_{x3})$ and $(W_{x41}, W_{x42}, b_{x4})$ can be obtained.

Moreover, in the step (P3) and FIG. 4, the position coordinates $(x_{c1}, y_{c1})$~$(x_{cn1}, y_{cn2})$ of the plural standard points 21 are sequentially inputted into the input layer 11 of the neural network model, and then transmitted to the hidden layer 12. Moreover, a transfer function of each neuron 121 of the hidden layer 12 is a non-linear function. It is preferred that the transfer function of each neuron 121 of the hidden layer 12 is a sigmoid function. However, those skilled in the art will readily observe that other kinds of non-linear functions may be used in the image distortion correction method of the present invention according to the practical requirements.

In case that the coordinate $(x_c, y_c)$ is inputted into the input layer 11, the sigmoid function values $f(N_{y1})$~$f(N_{y4})$ are expressed by the following equation:

$$f(N_{yk}) = \frac{2}{1 + e^{-\gamma N_{yk}}} - 1,$$

$$N_{yk} = \sum x_c W_{yk1} + y_c W_{yk2} + b_{yk},$$

$$k = 1 \sim 4;$$

The sigmoid function values $f(N_{y1})$~$f(N_{y4})$ obtained by the neurons 121 of the hidden layer 12 are transmitted to the output layer 13. Then, the output values obtained by the output layer 13 and the second direction coordinate change amount $d_y$ corresponding to the position coordinate $(x_c, y_c)$ are compared with each other. According to the comparing result, the second direction parameter group $(W_{y11}, W_{y12}, b_{y1})$, $(W_{y21}, W_{y22}, b_{y2})$, $(W_{y31}, W_{y32}, b_{y3})$ and $(W_{y41}, W_{y42}, b_{y4})$ can be adjusted. Through sequentially inputting the position coordinates $(x_{c1}, y_{c1})$~$(x_{cn1}, y_{cn2})$ of the plural standard points 21 into the neural network model repeatedly, the second direction parameter group $(W_{y11}, W_{y12}, b_{y1})$, $(W_{y21}, W_{y22}, b_{y2})$, $(W_{y31}, W_{y32}, b_{y3})$ and $(W_{y41}, W_{y42}, b_{y4})$ can be trained by the neural network model. After the training process is completed, appropriate values of the second direction parameter group $(W_{y11}, W_{y12}, b_{y1})$, $(W_{y21}, W_{y22}, b_{y2})$, $(W_{y31}, W_{y32}, b_{y3})$ and $(W_{y41}, W_{y42}, b_{y4})$ can be obtained.

After the off-line training operations on the first direction parameter group $(W_{x11}, W_{x12}, b_{x1})$, $(W_{x21}, W_{x22}, b_{x2})$, $(W_{x31}, W_{x32}, b_{x3})$ and $(W_{x41}, W_{x42}, b_{x4})$ and the second direction parameter group $(W_{y11}, W_{y12}, b_{y1})$, $(W_{y21}, W_{y22}, b_{y2})$, $(W_{y31}, W_{y32}, b_{y3})$ and $(W_{y41}, W_{y42}, b_{y4})$ are completed, any original image 4 (see FIG. 9) captured by the image pickup device 9 can be corrected as an correction image 5 (i.e. a non-distortion image, see FIG. 10) by the neural network model. The detailed description of this step will be illustrated later.

In the above off-line training process, the first direction indicates the horizontal direction (i.e. the x-axis direction), and the second direction indicates the vertical direction (i.e. the y-axis direction). In addition, the first direction coordinate change amount indicates the horizontal direction coordinate change amount (i.e. the x-axis direction coordinate change amount), and the second direction coordinate change amount indicates the vertical direction coordinate change amount (i.e. the y-axis direction coordinate change amount). In addition, the first direction parameter group indicates the horizontal direction parameter group (i.e. the x-axis direction parameter group), and the second direction parameter group indicates the vertical direction parameter group (i.e. the y-axis direction parameter group). The above definitions are not restricted. For example, in some other embodiments, the first direction and the second direction indicate the vertical direction and the horizontal direction, respectively; the first direction coordinate change amount and the second direction coordinate change amount indicate the vertical direction coordinate change amount and the horizontal direction coordinate change amount, respectively; and the first direction parameter group and the second direction parameter group indicate the vertical direction parameter group and the horizontal direction parameter group, respectively. That is, for implementing the off-line training process, the y-axis direction parameter group of the neural network model is firstly trained, and then the x-axis direction parameter group of the neural network model is trained.

Figure 8:
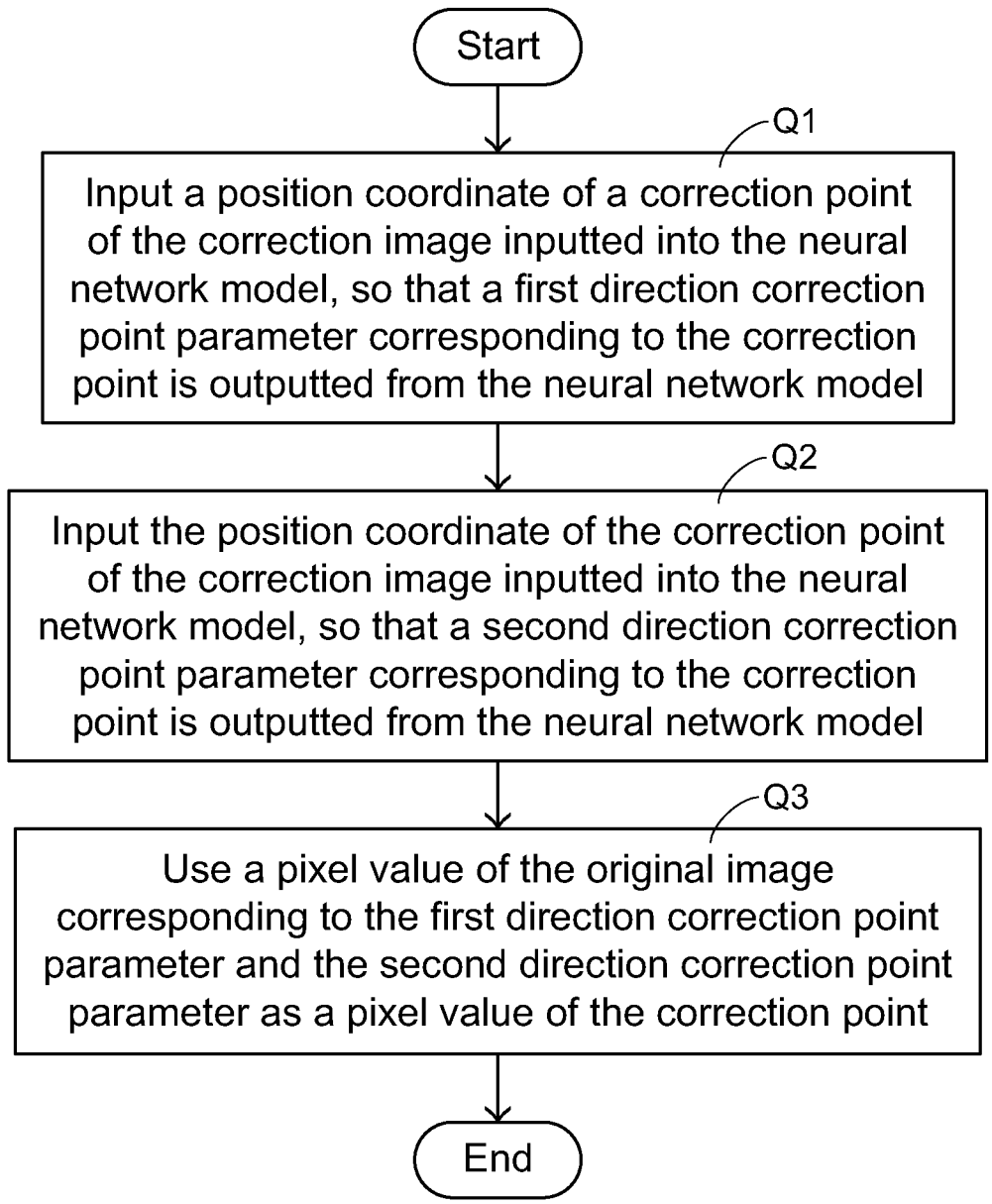
FIG. 8 is a flowchart illustrating an exemplary correcting process of the image distortion correction method of FIG. 1.
Figure 9:
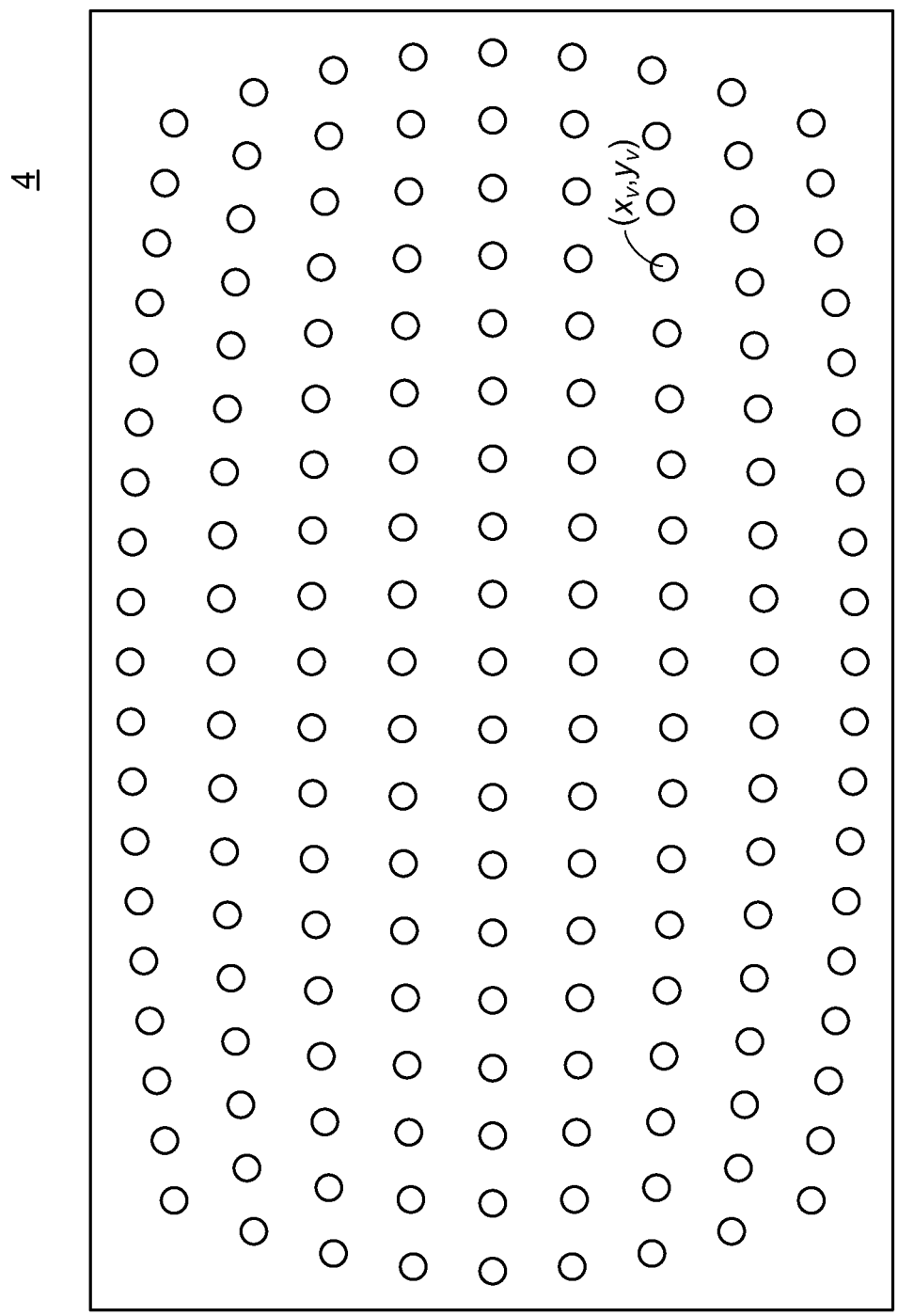
FIG. 9 schematically illustrates the original image as described in FIG. 8.
Figure 10:
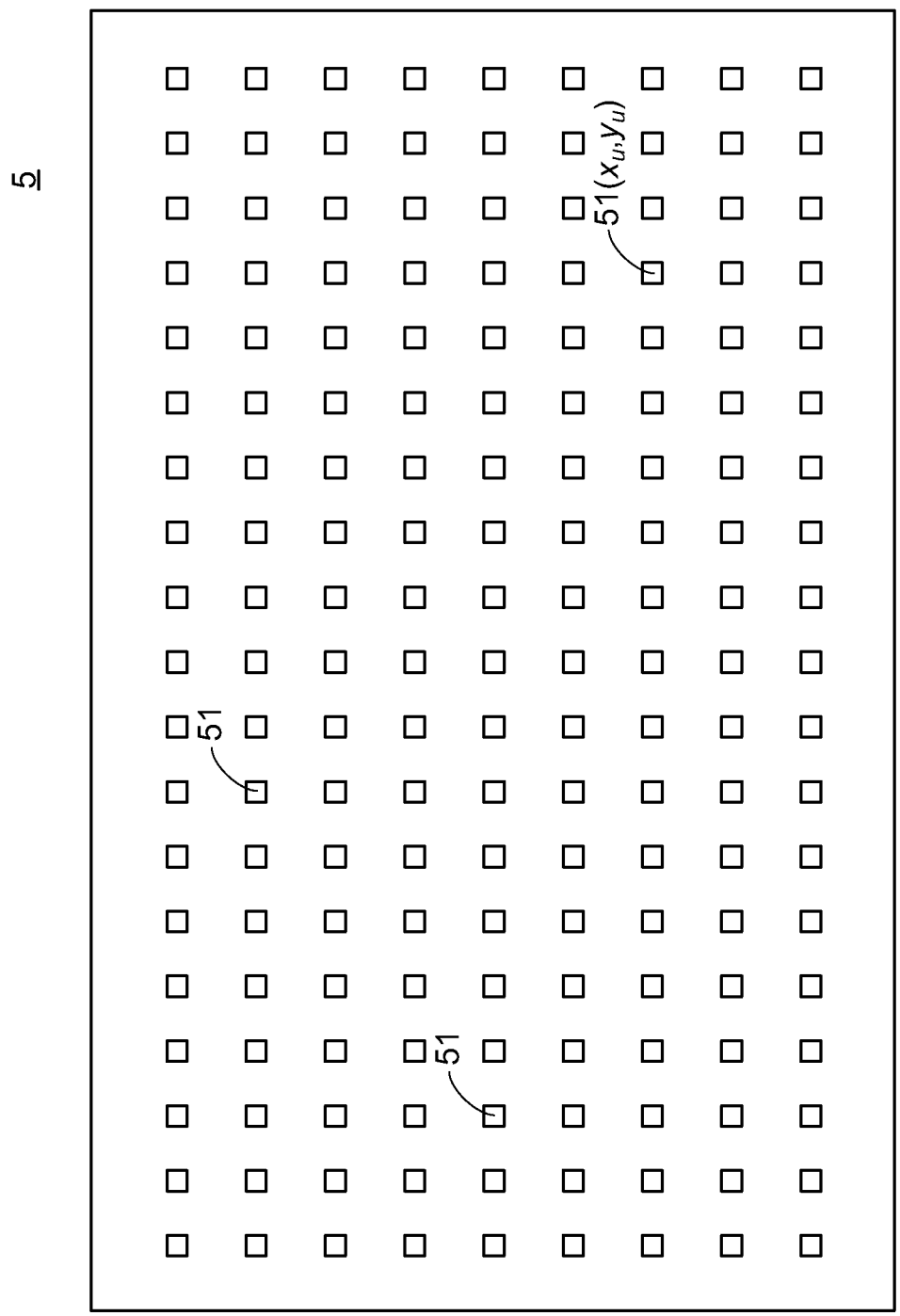
FIG. 10 schematically illustrates the correction image as described in FIG. 8.

Hereinafter, the correcting process of the image distortion correction method will be illustrated with reference to FIGS. 8-10. FIG. 8 is a flowchart illustrating an exemplary correcting process of the image distortion correction method of FIG. 1. FIG. 9 schematically illustrates the original image as described in FIG. 8. FIG. 10 schematically illustrates the correction image as described in FIG. 8. The correction image 5 comprises plural correction points 51. By the correcting process, an accurate pixel value of each correction point 51 is obtained. The correcting process comprises the following steps. In the step (Q1), a position coordinate of a correction point 51 of the correction image 5 is inputted into the neural network model, so that a first direction correction point parameter corresponding to the correction point 51 is outputted from the neural network model. In the step (Q2), the position coordinate of the correction point 51 of the correction image 5 is inputted into the neural network model, so that a second direction correction point parameter corresponding to the correction point 51 is outputted from the neural network model. In the step (Q3), the pixel value of the original image 4 corresponding to the first direction correction point parameter and the second direction correction point parameter is used as the pixel value of the correction point 51.

For example, each correction point 51 of the correction image 5 has a position coordinate $(x_u, y_u)$. In the step (Q1), the first direction correction point parameter is generated and outputted from the neural network model according to the first direction parameter group $(W_{x11}, W_{x12}, b_{x1})$, $(W_{x21}, W_{x22}, b_{x2})$, $(W_{x31}, W_{x32}, b_{x3})$ and $(W_{x41}, W_{x42}, b_{x4})$. In an embodiment, the first direction correction point parameter is a first direction coordinate correction amount $dx_u$. In the step (Q2), the second direction correction point parameter is generated and outputted from the neural network model according to the second direction parameter group $(W_{y11}, W_{y12}, b_{y1})$, $(W_{y21}, W_{y22}, b_{y2})$, $(W_{y31}, W_{y32}, b_{y3})$ and $(W_{y41}, W_{y42}, b_{y4})$. In an embodiment, the second direction correction point parameter is a second direction coordinate correction amount $dy_u$.

Moreover, after an arithmetic operation is performed on the first direction coordinate correction amount $dx_u$ and the first direction position coordinate $x_u$ of the correction point 51, a first direction arithmetic coordinate $x_v$ is obtained. Similarly, after the arithmetic operation is performed on the second direction coordinate correction amount $dy_u$ and the second direction position coordinate $y_u$ of the correction point 51, a second direction arithmetic coordinate $y_v$ is obtained. In this embodiment, the arithmetic operation is an addition operation. Consequently, the first direction arithmetic coordinate $x_v$ and the second direction arithmetic coordinate $y_v$ are a first direction sum coordinate and a second direction sum coordinate, respectively. That is, $(x_v, y_v)=(x_u+dx_u, y_u+dy_u)$.

In the step (Q3), it is preferred that the pixel value at the arithmetic coordinate $(x_v, y_v)$ of the original image 4 is used as the pixel value of the correction point 51 of the correction image 5 with the position coordinate $(x_u, y_u)$. Alternatively, the pixel values of plural neighboring points around the arithmetic coordinate $(x_v, y_v)$ of the original image 4 may be interpolated as the pixel value of the correction point 51 of the correction image 5 with the position coordinate $(x_u, y_u)$.

From the above discussions, after each correction point 51 of the correction image 5 is subject to the steps (Q1), (Q2) and (Q3), the accurate pixel value is obtained. After the accurate pixel values of all correction points 51 are obtained, the non-distortion image is produced.

In the above correcting process, the first direction correction point parameter indicates the horizontal direction correction point parameter (i.e. the x-axis direction coordinate correction amount), and the second direction correction point parameter indicates the vertical direction correction point parameter (i.e. the y-axis direction coordinate correction amount). In addition, the first direction parameter group indicates the horizontal direction parameter group (i.e. the x-axis direction parameter group), and the second direction parameter group indicates the vertical direction parameter group (i.e. the y-axis direction parameter group). In addition, the first direction position coordinate indicates the horizontal direction position coordinate (i.e. the x-axis direction position coordinate), and the second direction coordinate indicates the vertical direction position coordinate (i.e. the y-axis direction position coordinate). In addition, the first direction arithmetic coordinate indicates the horizontal direction arithmetic coordinate (i.e. the x-axis direction sum coordinate), and the second direction arithmetic coordinate indicates the vertical direction arithmetic coordinate (i.e. the y-axis direction sum coordinate). The above definitions are not restricted. For example, in some other embodiments, the first direction correction point parameter and the second direction correction point parameter indicate the vertical direction correction point parameter and the horizontal direction correction point parameter, respectively; the first direction parameter group and the second direction parameter group indicate the vertical direction parameter group and the horizontal direction parameter group, respectively; the first direction position coordinate and the second direction position coordinate indicate the vertical direction position coordinate and the horizontal position direction coordinate, respectively; and the first direction arithmetic coordinate and the second direction arithmetic coordinate indicate the vertical direction arithmetic coordinate and the horizontal direction arithmetic coordinate, respectively. That is, for calculating the pixel value of any correction point 51 of the correction image 5 in the correcting process, the y-axis direction coordinate correction amount is firstly obtained by the neural network model, and then the x-axis direction coordinate correction amount is obtained by the neural network model. It is noted that numerous modifications and alterations may be made while retaining the teachings of the invention. For example, in some other embodiments, the x-axis direction coordinate correction amount and the y-axis direction coordinate correction amount are obtained by the neural network model in a parallel processing manner.

The spirits of the image distortion correction method of the present invention will be illustrated as follows. Firstly, a dimensionality reduction technique is used to construct the neural network model. Consequently, a single direction correction point parameter (e.g. the x-axis direction correction point parameter or the y-axis direction correction point parameter) is outputted from the neural network model. In comparison with the conventional neural network model which outputs the correction point parameter corresponding to two directions (x-axis direction and the y-axis direction), the image distortion correction method of the present invention can effectively reduce the number of the neurons 121 of the hidden layer 12 and reduce cost and space usage. Secondly, the output of the neural network model is a numeric correction amount (e.g. the first direction coordinate correction amount $dx_u$ or the second direction coordinate correction amount $dx_y$). The numeric correction amount and the position coordinate inputted into the neural network model are subject to an arithmetic operation (e.g. the addition operation). In comparison with the conventional neural network model which directly outputs the first direction arithmetic coordinate $x_v$ (i.e. the x-axis direction sum coordinate) and the second direction arithmetic coordinate $y_v$ (i.e. the y-axis direction sum coordinate), the image distortion correction method of the present invention can effectively reduce the number of the neurons 121 of the hidden layer 12 and reduce cost and space usage. According to the above two benefits, the image distortion correction method of the present invention may be implemented by using the hidden layer 12 with only four neurons 121. The number of the neurons 121 is presented herein for purpose of illustration and description only. It is noted that the number of the neurons 121 of the hidden layer 12 may be varied according to practical requirements.

Figure 11:
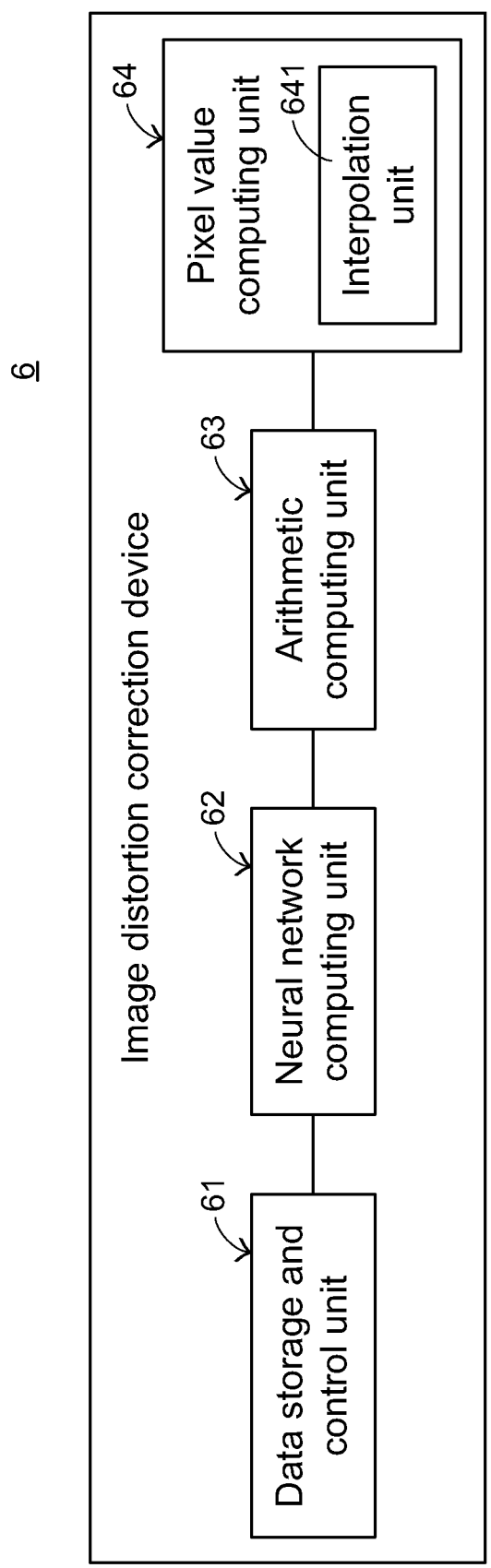
FIG. 11 is a schematic functional block diagram illustrating an image distortion correction device using the image distortion correction method according to an embodiment of the present invention.
Figure 12:
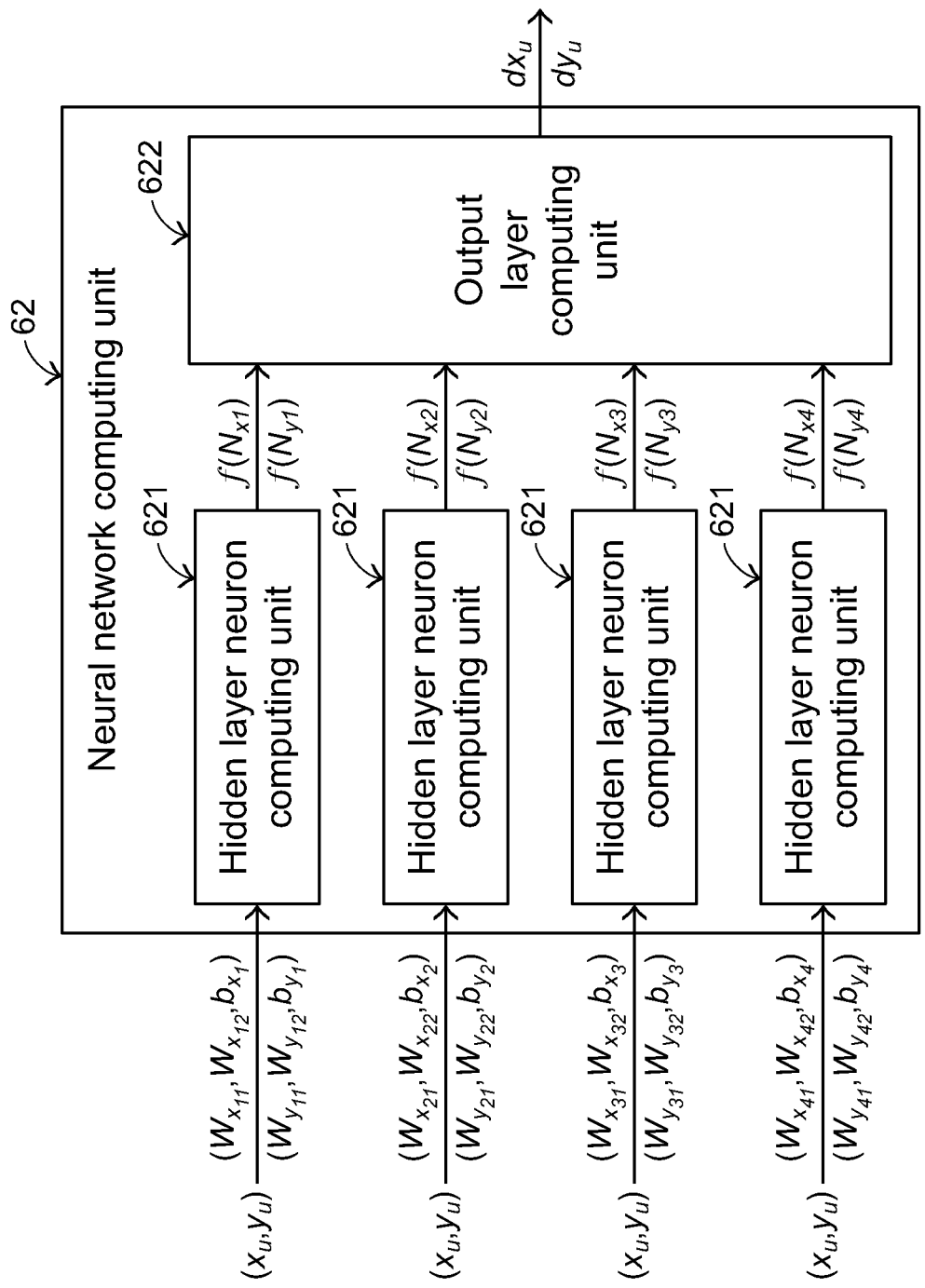
FIG. 12 is a schematic functional block diagram illustrating a neural network computing unit of the image distortion correction device of FIG. 11.
Figure 13:
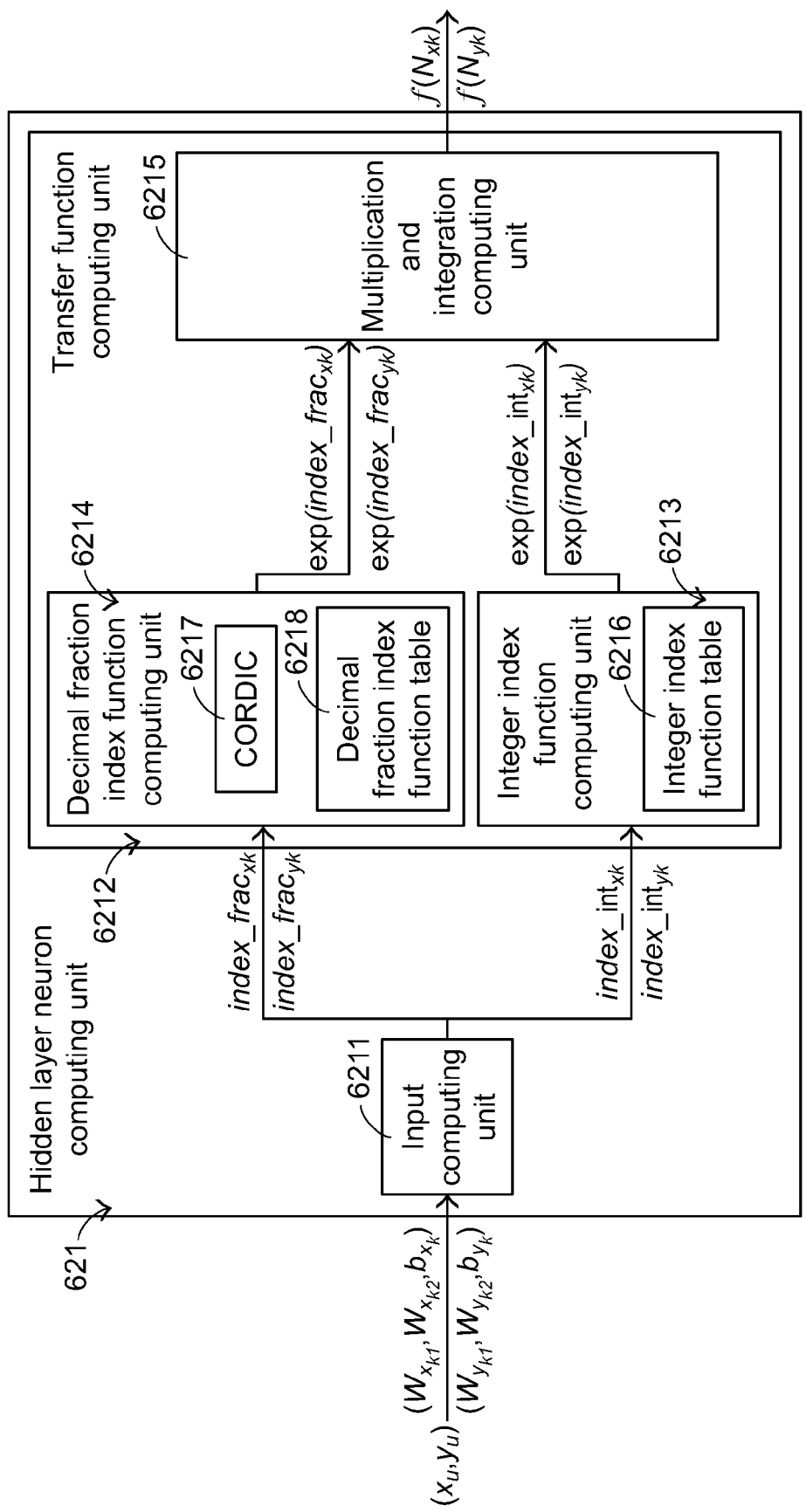
FIG. 13 is a schematic functional block diagram illustrating a hidden layer neuron computing unit of the neural network computing unit of FIG. 12.

Please refer to FIGS. 11-13. FIG. 11 is a schematic functional block diagram illustrating an image distortion correction device using the image distortion correction method according to an embodiment of the present invention. FIG. 12 is a schematic functional block diagram illustrating a neural network computing unit of the image distortion correction device of FIG. 11. FIG. 13 is a schematic functional block diagram illustrating a hidden layer neuron computing unit of the neural network computing unit of FIG. 12.

As shown in FIGS. 11-13, the image distortion correction device 6 comprises a data storage and control unit 61, a neural network computing unit 62, an arithmetic computing unit 63, and a pixel value computing unit 64. In a preferred embodiment, the image distortion correction device 6 is implemented by a field-programmable gate array (FPGA) or a very-large-scale integration (VLSI) circuit, but is not limited thereto. However, those skilled in the art will readily observe that the image distortion correction device 6 may be implemented by other programmable logic devices or integrated circuits.

Moreover, the data storage and control unit 61 is used to obtain the position coordinates of all correction points 51, the first direction parameter group $(W_{x11}, W_{x12}, b_{x1})$, $(W_{x21}, W_{x22}, b_{x2})$, $(W_{x31}, W_{x32}, b_{x3})$ and $(W_{x41}, W_{x42}, b_{x4})$ and the second direction parameter group $(W_{y11}, W_{y12}, b_{y1})$, $(W_{y21}, W_{y22}, b_{y2})$, $(W_{y31}, W_{y32}, b_{y3})$ and $(W_{y41}, W_{y42}, b_{y4})$. For example, after the off-line training process as described in FIG. 2 is performed by the data storage and control unit 61, the first direction parameter group $(W_{x11}, W_{x12}, b_{x1})$, $(W_{x21}, W_{x22}, b_{x2})$, $(W_{x31}, W_{x32}, b_{x3})$ and $(W_{x41}, W_{x42}, b_{x4})$ and the second direction parameter group $(W_{y11}, W_{y12}, b_{y1})$, $(W_{y21}, W_{y22}, b_{y2})$, $(W_{y31}, W_{y32}, b_{y3})$ and $(W_{y41}, W_{y42}, b_{y4})$ are calculated. Alternatively, in some other embodiments, after the off-line training process as described in FIG. 2 is performed by a front-end computing unit (not shown) which is connected with the data storage and control unit 61, the first direction parameter group ($W_{x11}$, $W_{x12}$, $b_{x1}$), ($W_{x21}$, $W_{x22}$, $b_{x2}$), ($W_{x31}$, $W_{x32}$, $b_{x3}$) and ($W_{x41}$, $W_{x42}$, $b_{x4}$) and the second direction parameter group ($W_{y11}$, $W_{y12}$, $b_{y1}$), ($W_{y21}$, $W_{y22}$, $b_{y2}$), ($W_{y31}$, $W_{y32}$, $b_{y3}$) and ($W_{y41}$, $W_{y42}$, $b_{y4}$) are calculated.

The neural network computing unit 62 is connected with the data storage and control unit 61. After the position coordinates of the plural correction points 51, the first direction parameter group ($W_{x11}$, $W_{x12}$, $b_{x1}$), ($W_{x21}$, $W_{x22}$, $b_{x2}$), ($W_{x31}$, $W_{x32}$, $b_{x3}$) and ($W_{x41}$, $W_{x42}$, $b_{x4}$) and the second direction parameter group ($W_{y11}$, $W_{y12}$, $b_{y1}$), ($W_{y21}$, $W_{y22}$, $b_{y2}$), ($W_{y31}$, $W_{y32}$, $b_{y3}$) and ($W_{y41}$, $W_{y42}$, $b_{y4}$) are received by the neural network computing unit 62, the first direction correction point parameter and the second direction correction point parameter corresponding to each correction point 51 is calculated and outputted from the neural network computing unit 62. The first direction correction point parameter and the second direction correction point parameter corresponding to each correction point 51 are obtained by performing the steps (Q1) and (Q2) of the flowchart as shown in FIG. 8.

In this embodiment, the neural network computing unit 62 comprises plural hidden layer neuron computing units 621 and an output layer computing unit 622. The number of the hidden layer neuron computing units 621 is identical to the number of the neurons 121 of the hidden layer 12. Each of the hidden layer neuron computing units 621 comprises an input computing unit 6211 and a transfer function computing unit 6212. In this embodiment, the number of the hidden layer neuron computing units 621 is four. In addition, the input computing unit 6211 is an index computing unit, and the transfer function computing unit 6212 is a non-linear function computing unit.

The transfer function computing unit 6212 is connected between the input computing unit 6211 and the output layer computing unit 622. After the position coordinate of the correction point 51 is received by the input computing unit 6211, the input computing unit 6211 generates and outputs an index value $index_{xk}$ to the transfer function computing unit 6212 according to the first direction parameter group ($W_{x11}$, $W_{x12}$, $b_{x1}$), ($W_{x21}$, $W_{x22}$, $b_{x2}$), ($W_{x31}$, $W_{x32}$, $b_{x3}$) and ($W_{x41}$, $W_{x42}$, $b_{x4}$). Similarly, after the position coordinate of the correction point 51 is received by the input computing unit 6211, the input computing unit 6211 generates and outputs an index value $index_{yk}$ to the transfer function computing unit 6212 according to the second direction parameter group ($W_{y11}$, $W_{y12}$, $b_{y1}$), ($W_{y21}$, $W_{y22}$, $b_{y2}$), ($W_{y31}$, $W_{y32}$, $b_{y3}$) and ($W_{y41}$, $W_{y42}$, $b_{y4}$). The index values $index_{xk}$ and $index_{yk}$ are index values of a sigmoid function. The index values $index_{xk}$ and $index_{yk}$ may be expressed by the following formulae:

$$index_{xk} = -\gamma N_{xk}, index_{yk} = -\gamma N_{yk}, k = 1\sim 4.$$

Moreover, the index value $index_{xk}$ may be divided into an integer index value $index\_int_{xk}$ and a decimal fraction index value $index\_frac_{xk}$, and the index value $index_{yk}$ may be divided into an integer index value $index\_int_{yk}$ and a decimal fraction index value $index\_frac_{yk}$.

The transfer function computing unit 6212 comprises an integer index function computing unit 6213, a decimal fraction index function computing unit 6214, and a multiplication and integration computing unit 6215. The multiplication and integration computing unit 6215 is connected with the integer index function computing unit 6213 and the decimal fraction index function computing unit 6214. After the integer index value $index\_int_{xk}$ is received by the integer index function computing unit 6213, the integer index function computing unit 6213 generates and outputs a corresponding integer index function value $exp(index\_int_{xk})$. Similarly, after the integer index value $index\_int_{yk}$ is received by the integer index function computing unit 6213, the integer index function computing unit 6213 generates and outputs a corresponding integer index function value $exp(index\_int_{yk})$. After the decimal fraction index value $index\_frac_{xk}$ is received by the decimal fraction index function computing unit 6214, the decimal fraction index function computing unit 6214 generates and outputs a corresponding decimal fraction index function value $exp(index\_frac_{xk})$. Similarly, after the decimal fraction index value $index\_frac_{yk}$ is received by the decimal fraction index function computing unit 6214, the decimal fraction index function computing unit 6214 generates and outputs a corresponding decimal fraction index function value $exp(index\_frac_{yk})$.

After the integer index function value $exp(index\_int_{xk})$ and the decimal fraction index function value $exp(index\_frac_{xk})$ are received by the multiplication and integration computing unit 6215, the multiplication and integration computing unit 6215 calculates the product $exp(index_{xk})$ of the integer index function value $exp(index\_int_{xk})$ and the decimal fraction index function value $exp(index\_frac_{xk})$, thereby generating and outputting the non-linear function value $f(N_{xk})$. Similarly, after the integer index function value $exp(index\_int_{yk})$ and the decimal fraction index function value $exp(index\_frac_{yk})$ are received by the multiplication and integration computing unit 6215, the multiplication and integration computing unit 6215 calculates the product $exp(index_{yk})$ of the integer index function value $exp(index\_int_{yk})$ and the decimal fraction index function value $exp(index\_frac_{yk})$, thereby generating and outputting the non-linear function value $f(N_{yk})$. For illustration and hardware simplification, the non-linear function values $f(N_{xk})$ and $f(N_{yk})$ may be simplified.

In a preferred embodiment, the integer index function computing unit 6213 has an integer index function table 6216. The integer index function table 6216 is a relationship table about the relationship between plural integer index values $index\_int_{xk}$ and plural integer index function values $exp(index\_int_{xk})$ and the relationship between plural integer index values $index\_int_{yk}$ and plural integer index function values $exp(index\_int_{yk})$. After the integer index value $index\_int_{xk}$ is received by the integer index function computing unit 6213, the corresponding integer index function value $exp(index\_int_{xk})$ may be directly obtained by looking up the integer index function table 6216 and then outputted. Similarly, after the integer index value $index\_int_{yk}$ is received by the integer index function computing unit 6213, the corresponding integer index function value $exp(index\_int_{yk})$ may be directly obtained by looking up the integer index function table 6216 and then outputted.

Moreover, in this embodiment, the decimal fraction index function computing unit 6214 comprises a coordinate rotation digital computer (CORDIC) 6217. After the decimal fraction index value $index\_frac_{xk}$ is received by the decimal fraction index function computing unit 6214, the coordinate rotation digital computer (CORDIC) 6217 performs an index computation on the decimal fraction index value $index\_frac_{xk}$, so that the decimal fraction index function value $exp(index\_frac_{xk})$ is obtained. Similarly, after the decimal fraction index value $index\_frac_{yk}$ is received by the decimal fraction index function computing unit 6214, the coordinate rotation digital computer (CORDIC) 6217 performs an index computation on the decimal fraction index value $index\_frac_{yk}$, so that the decimal fraction index function value $exp(index\_frac_{yk})$ is obtained. The principles of the coordinate rotation digital computer (CORDIC) 6217 are well known to those skilled in the art, and are not redundantly described herein.

As known, when the index computation is performed on some of the decimal fraction index values index_frac$_{xk}$ by the coordinate rotation digital computer 6217, an error to a certain extent may be generated. In this embodiment, a decimal fraction index function table 6218 is included in the decimal fraction index function computing unit 6214 in order to reduce the error. The decimal fraction index function table is a relationship table about the relationship between plural decimal fraction index values index_frac$_{xk}$ and plural decimal fraction index function values exp(index_frac$_{xk}$) and the relationship between plural decimal fraction index values index_frac$_{yk}$ and plural decimal fraction index function values exp(index_frac$_{yk}$). If the decimal fraction index value index_frac$_{xk}$ received by the decimal fraction index function computing unit 6214 is smaller than a predetermined value, the decimal fraction index function value exp(index_frac$_{xk}$) is calculated by the coordinate rotation digital computer 6217. Whereas, if the decimal fraction index value index_frac$_{xk}$ received by the decimal fraction index function computing unit 6214 is larger than the predetermined value, the decimal fraction index function value exp(index_frac$_{xk}$) is calculated by looking up the decimal fraction index function table 6218. Similarly, if the decimal fraction index value index_frac$_{yk}$ received by the decimal fraction index function computing unit 6214 is smaller than the predetermined value, the decimal fraction index function value exp(index_frac$_{yk}$) is calculated by the coordinate rotation digital computer 6217. Whereas, if the decimal fraction index value index_frac$_{yk}$ received by the decimal fraction index function computing unit 6214 is larger than the predetermined value, the decimal fraction index function value exp(index_frac$_{yk}$) is calculated by looking up the decimal fraction index function table 6218. For example, the predetermined value is 0.25, but is not limited thereto.

It is noted that the use of the coordinate rotation digital computer (CORDIC) 6217 and/or the decimal fraction index function table 6218 to perform the index computation is presented herein for purpose of illustration and description only. However, those skilled in the art will readily observe that numerous modifications and alterations may be made according to the practical requirements. For example, in some other embodiments, the decimal fraction index function computing unit 6214 uses a Taylor series expansion to perform the index computation. The principles of the Taylor series expansion are well known to those skilled in the art, and are not redundantly described herein. Alternatively, in some other embodiments, the decimal fraction index function computing unit 6214 uses the decimal fraction index function table 6218 and the Taylor series expansion simultaneously to perform the index computation.

Moreover, after the non-linear function value $f(N_{xk})$ from each hidden layer neuron computing unit 621 is received by the output layer computing unit 622, the output layer computing unit 622 generates a corresponding first direction correction point parameter. Similarly, the non-linear function value $f(N_{yk})$ from each hidden layer neuron computing unit 621 is received by the output layer computing unit 622, the output layer computing unit 622 generates a corresponding second direction correction point parameter.

Moreover, the arithmetic computing unit 63 is connected with the neural network computing unit 62. The first direction correction point parameter from the neural network computing unit 62 and the position coordinate of each correction point 51 are subject to an arithmetic operation by the arithmetic computing unit 63, and the second direction correction point parameter from the neural network computing unit 62 and the position coordinate of each correction point 51 are subject to the arithmetic operation by the arithmetic computing unit 63. Consequently, the arithmetic coordinate of each correction point 51 is obtained.

Afterwards, the pixel value computing unit 64 is connected with the arithmetic computing unit 63 for performing the step (Q3) of the flowchart as shown in FIG. 8. That is, the pixel value computing unit 64 may use the pixel value of the original image 4 corresponding to the arithmetic coordinate as the pixel value of the correction point 51 of the correction image 5.

Please refer to the flowchart of FIG. 8 again. In case that the correction point 51 of the correction image 5 has the position coordinate $(x_u, y_u)$, the neural network computing unit 62 is used for calculating and outputting the first direction coordinate correction amount $dx_u$ and the second direction coordinate correction amount $dy_u$. After an arithmetic operation is performed on the first direction coordinate correction amount $dx_u$ and the first direction position coordinate $x_u$ of the correction point 51 by the arithmetic computing unit 63, the first direction arithmetic coordinate $x_v$ is obtained (i.e. the first direction sum coordinate is $x_u+dx_u$). Similarly, after an arithmetic operation is performed on the second direction coordinate correction amount $dy_u$ and the second direction position coordinate $y_u$ of the correction point 51 by the arithmetic computing unit 63, the second direction arithmetic coordinate $y_v$ is obtained (i.e. the second direction sum coordinate is $y_u+dy_u$).

Afterwards, by the pixel value computing unit 64, the pixel value at the arithmetic coordinate $(x_v, y_v)$ of the original image 4 is used as the pixel value of the correction point 51 of the correction image 5 with the position coordinate $(x_u, y_u)$. In this embodiment, the pixel value computing unit 64 further comprises an interpolation unit 641 for interpolating pixel values of plural neighboring points around the arithmetic coordinate $(x_v, y_v)$ of the original image 4, thereby obtaining the pixel value of the correction point 51 with the position coordinate $(x_u, y_u)$.

Figure 14:
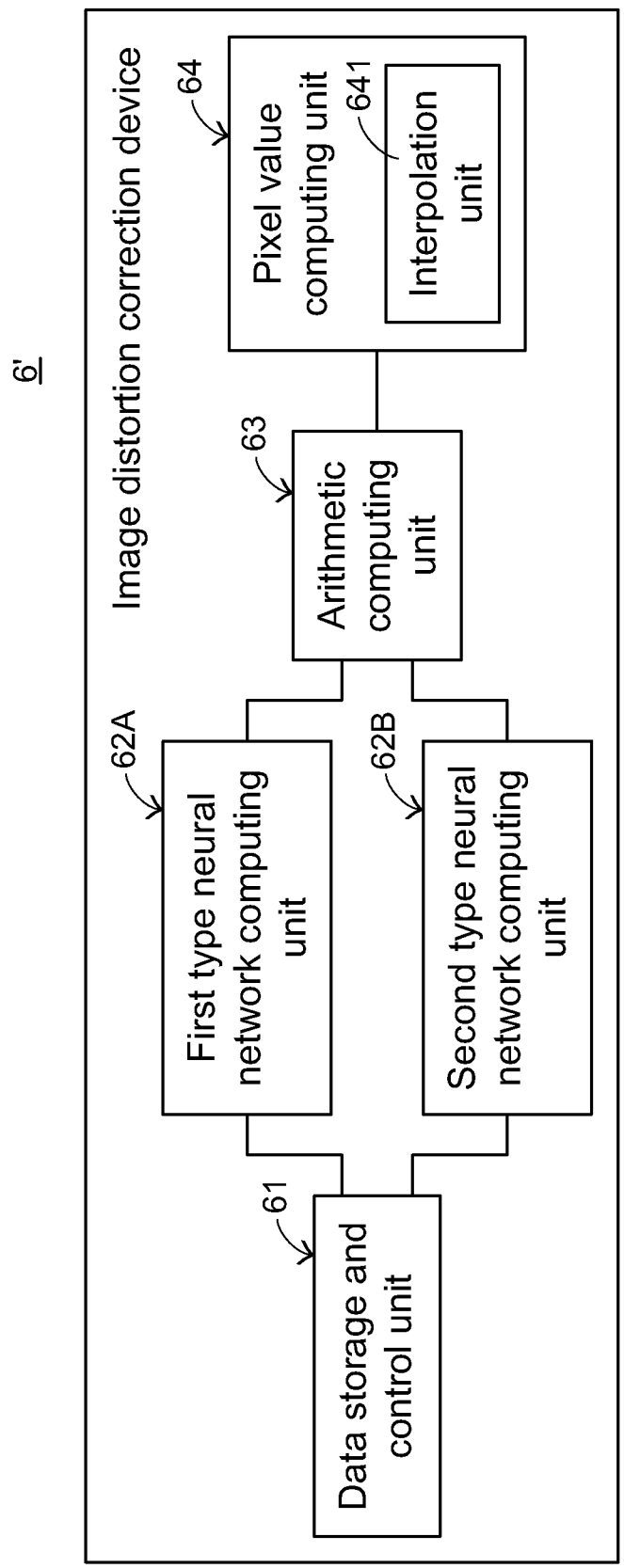
FIG. 14 is a schematic functional block diagram illustrating an image distortion correction device using the image distortion correction method according to another embodiment of the present invention.
Figure 15:
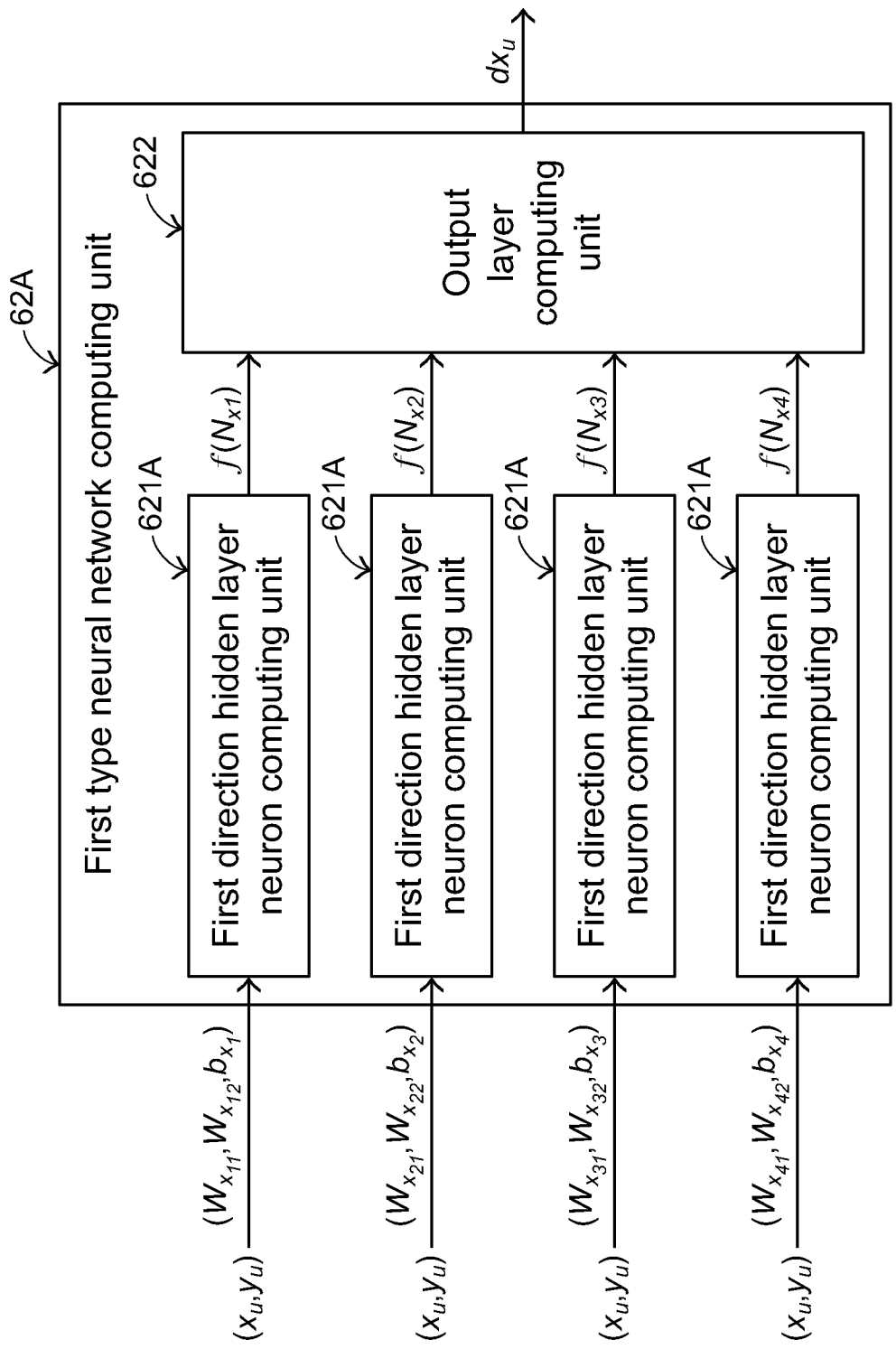
FIG. 15 is a schematic functional block diagram illustrating a first type neural network computing unit of the image distortion correction device of FIG. 14.
Figure 16:
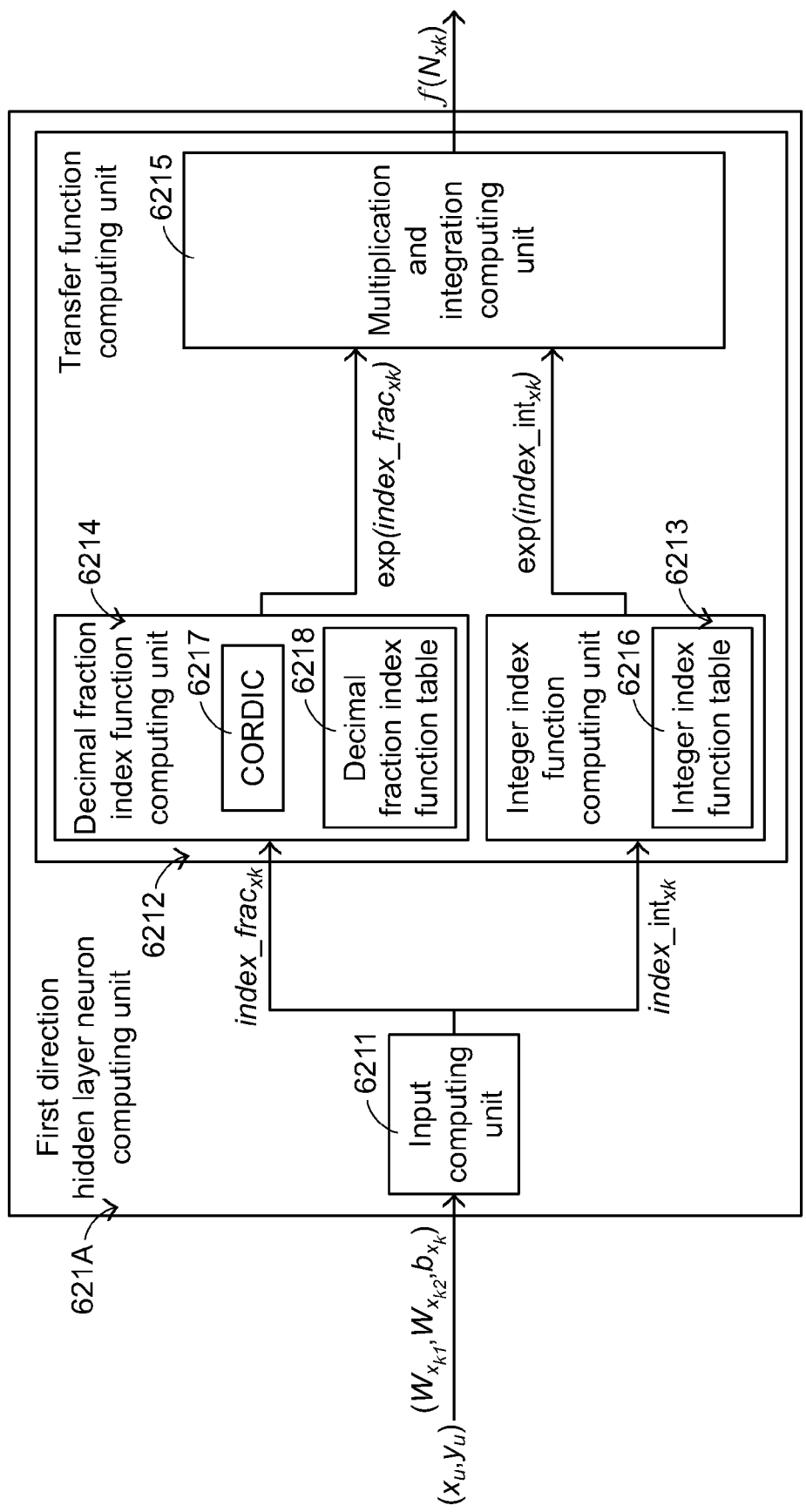
FIG. 16 is a schematic functional block diagram illustrating a first direction hidden layer neuron computing unit of the first type neural network computing unit of FIG. 15.
Figure 17:
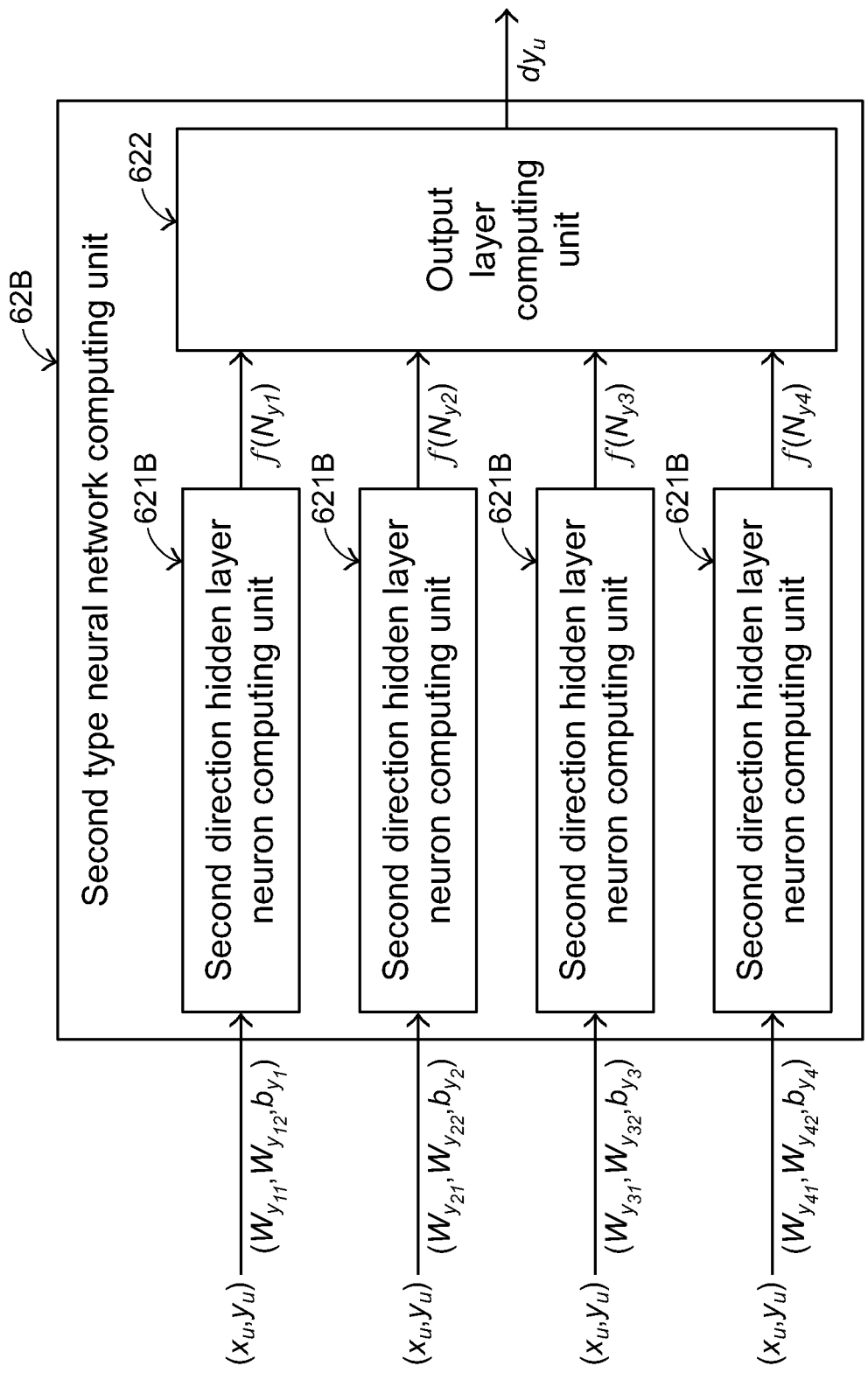
FIG. 17 is a schematic functional block diagram illustrating a second type neural network computing unit of the image distortion correction device of FIG. 14.
Figure 18:
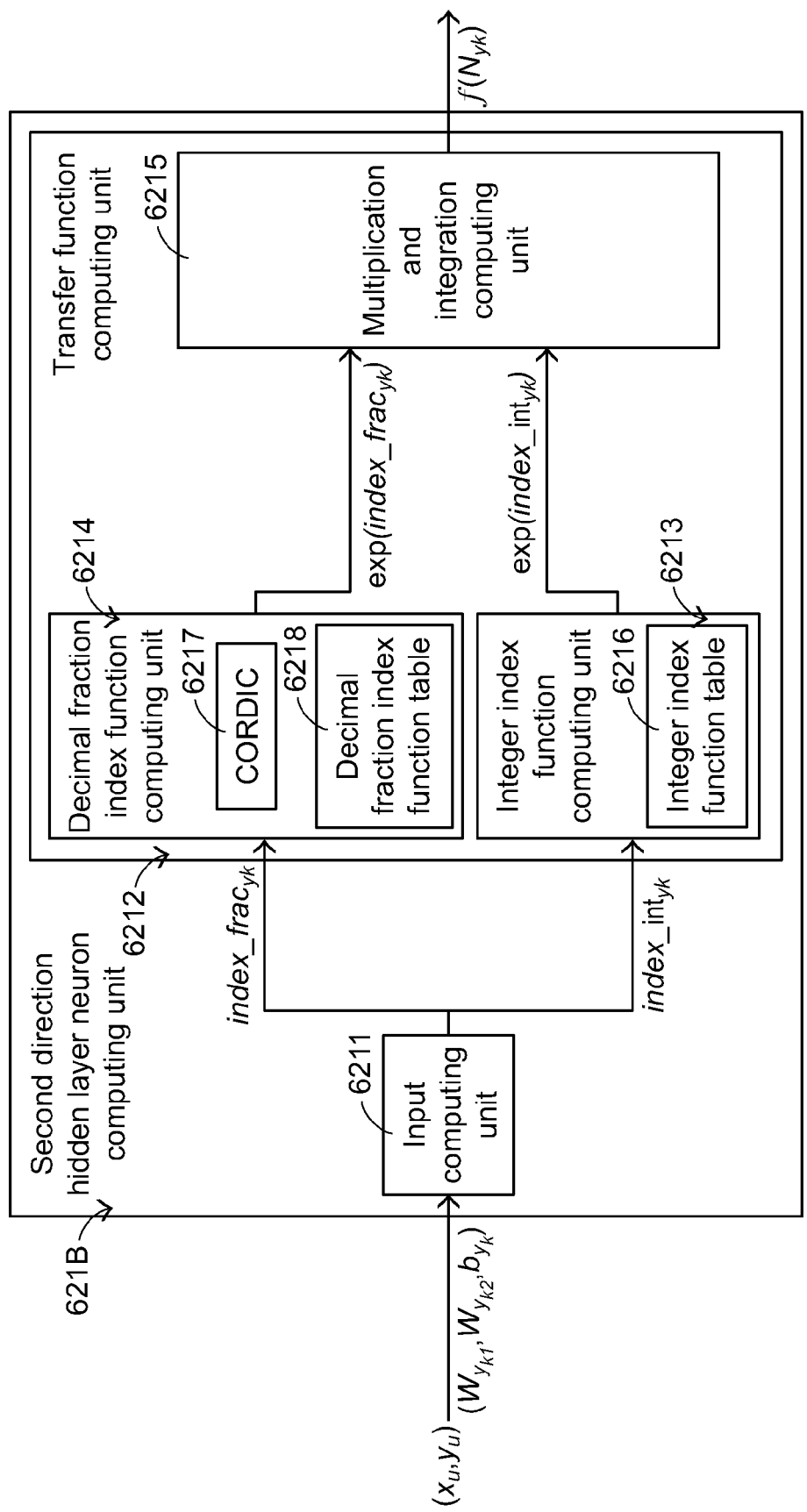
FIG. 18 is a schematic functional block diagram illustrating a second direction hidden layer neuron computing unit of the second type neural network computing unit of FIG. 16.

Please refer to FIGS. 14-18. FIG. 14 is a schematic functional block diagram illustrating an image distortion correction device using the image distortion correction method according to another embodiment of the present invention. FIG. 15 is a schematic functional block diagram illustrating a first type neural network computing unit of the image distortion correction device of FIG. 14. FIG. 16 is a schematic functional block diagram illustrating a first direction hidden layer neuron computing unit of the first type neural network computing unit of FIG. 15. FIG. 17 is a schematic functional block diagram illustrating a second type neural network computing unit of the image distortion correction device of FIG. 14. FIG. 18 is a schematic functional block diagram illustrating a second direction hidden layer neuron computing unit of the second type neural network computing unit of FIG. 16.

Except for the following items, the architecture and the operating principle of the image distortion correction device 6' of this embodiment are similar to those of the image distortion correction device 6 of the above embodiment, and are not redundantly described herein. In comparison with the image distortion correction device 6 using the single neural network computing unit 62 to perform the steps (Q1) and (Q2) of the flowchart as shown in FIG. 8, the image distortion correction device 6' of this embodiment uses two types of neural network computing units 62A and 62B for performing the steps (Q1) and (Q2) of the flowchart as shown in FIG. 8, respectively.

In particular, the image distortion correction device 6' of this embodiment comprises a first type neural network computing unit 62A and a second type neural network computing unit 62B. The first type neural network computing unit 62A comprises four first direction hidden layer neuron computing units 621A. The second type neural network computing unit 62B comprises four second direction hidden layer neuron computing units 621B. Consequently, the steps (Q1) and (Q2) of the flowchart as shown in FIG. 8 can be simultaneously performed.

From the above descriptions, the image distortion correction device 6 or 6' may be included in an image pickup device 9 for correcting the shot image. Those skilled in the art will readily observe that the image distortion correction method and the image distortion correction device 6 or 6' of the present invention may be applied to an image projection device while retaining the teachings of the invention. That is, by the image distortion correction method and the image distortion correction device of the present invention, the projection image with a desired shape can be produced according to the practical requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image distortion correction method, comprising steps of:
   (1) providing a standard picture and a target image, wherein the standard picture has plural standard points, and the target image has plural target points corresponding to the plural standard points;
   (2) providing a position coordinate of each standard point and a first direction coordinate change amount which is between each standard point and the corresponding target point to a neural network model so as to train and obtain a first direction parameter group of the neural network model, and providing the position coordinate of each standard point and a second direction coordinate change amount which is between each standard point and the corresponding target point to the neural network model so as to train and obtain a second direction parameter group of the neural network model; and
   (3) performing a correcting process to correct distortion of an original image by the neural network model according to the first direction parameter group and the second direction parameter group of the neural network model, so that a correction image is obtained.

2. The image distortion correction method according to claim 1, wherein in the step (1), the target image is obtained by using an image pickup device to shoot the standard picture, wherein in the step (3), the original image is captured by the image pickup device.

3. The image distortion correction method according to claim 1, wherein the correction image comprises at least one correction point, and the step (3) comprises sub steps of:
   (3-1) inputting a position coordinate of the at least one correction point into the neural network model, so that a first direction coordinate correction amount is outputted from the neural network model according to the first direction parameter group, wherein after the first direction coordinate correction amount and the position coordinate of the at least one correction point are added together, a first direction sum coordinate is obtained;
   (3-2) inputting the position coordinate of the at least one correction point into the neural network model, so that a second direction coordinate correction amount is outputted from the neural network model according to the second direction parameter group, wherein after the second direction coordinate correction amount and the position coordinate of the at least one correction point are added together, a second direction sum coordinate is obtained; and
   (3-3) using a pixel value of the original image corresponding to the first direction sum coordinate and the second direction sum coordinate as a pixel value of the at least one correction point.

4. The image distortion correction method according to claim 3, wherein in the step (3-3), the pixel value of the original image corresponding to the first direction sum coordinate and the second direction sum coordinate is obtained by interpolating pixel values of plural neighboring points around the first direction sum coordinate and the second direction sum coordinate of the original image.

5. The image distortion correction method according to claim 3,
   wherein the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively; or
   wherein the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

6. The image distortion correction method according to claim 1, wherein the neural network model comprises an input layer, a hidden layer and an output layer, and the hidden layer comprises plural neurons, wherein a transfer function of each neuron of the hidden layer is a non-linear function, the first direction parameter group comprises a first horizontal direction coordinate weight, a first vertical direction coordinate weight and a first direction bias value corresponding to at least one neuron of the hidden layer, and the second direction parameter group comprises a second horizontal direction coordinate weight, a second vertical direction coordinate weight and a second direction bias value corresponding to the at least one neuron of the hidden layer.

7. The image distortion correction method according to claim 6, wherein the hidden layer comprises four neurons.

8. An image distortion correction method for using a neural network model to perform a correcting operation on an original image so as to obtain a correction image with at least one correction point, the image distortion correction method comprising steps of:
   (1) inputting a position coordinate of the at least one correction point into the neural network model so as to allow the neural network model to output a first direction correction point parameter, and inputting the position coordinate of the at least one correction point into the neural network model so as to allow the neural network model to output a second direction correction point parameter; and (2) using a pixel value of the original image corresponding to the first direction correction point parameter and the second direction correction point parameter as a pixel value of the at least one correction point.

9. The image distortion correction method according to claim 8, wherein the first direction correction point parameter is a first direction coordinate correction amount, and the second direction correction point parameter is a second direction coordinate correction amount.

10. The image distortion correction method according to claim 9, wherein a first direction sum coordinate is obtained after the first direction coordinate correction amount and the position coordinate of the at least one correction point are added together, and a second direction sum coordinate is obtained after the second direction coordinate correction amount and the position coordinate of the at least one correction point are added together, wherein in the step (2), a pixel value of the original image corresponding to the first direction sum coordinate and the second direction sum coordinate is used as the pixel value of the at least one correction point.

11. The image distortion correction method according to claim 10, wherein in the step (2), the pixel value of the original image corresponding to the first direction sum coordinate and the second direction sum coordinate is obtained by interpolating pixel values of plural neighboring points around the first direction sum coordinate and the second direction sum coordinate of the original image.

12. The image distortion correction method according to claim 10,
    wherein the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively; or
    wherein the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

13. The image distortion correction method according to claim 8, wherein the neural network model comprises an input layer, a hidden layer and an output layer, and the hidden layer comprises plural neurons, wherein a transfer function of each neuron of the hidden layer is a non-linear function, wherein the first direction correction point parameter is outputted from the neural network model at least according to a first direction parameter group corresponding to at least one neuron of the hidden layer, and the second direction correction point parameter is outputted from the neural network model at least according to a second direction parameter group corresponding to the at least one neuron of the hidden layer, wherein the first direction parameter group comprises a first horizontal direction coordinate weight, a first vertical direction coordinate weight and a first direction bias value, and the second direction parameter group comprises a second horizontal direction coordinate weight, a second vertical direction coordinate weight and a second direction bias value.

14. The image distortion correction method according to claim 13, wherein the hidden layer comprises four neurons.

15. An image distortion correction method for using a neural network model to perform a correcting operation on an original image so as to obtain a correction image with at least one correction point, the image distortion correction method comprising steps of:
    (1) inputting a position coordinate of the at least one correction point into the neural network model so as to allow the neural network model to output a coordinate correction amount, and performing an arithmetic operation on the coordinate correction amount and the position coordinate of the at least one correction point so as to obtain an arithmetic coordinate; and
    (2) using a pixel value of the original image corresponding to the arithmetic coordinate as a pixel value of the at least one correction point.

16. The image distortion correction method according to claim 15, wherein in the step (2), the pixel value of the original image corresponding to the arithmetic coordinate is obtained by interpolating pixel values of plural neighboring points around the arithmetic coordinate of the original image.

17. The image distortion correction method according to claim 15, wherein the arithmetic operation is an addition operation, and the arithmetic coordinate is a sum coordinate.

18. The image distortion correction method according to claim 17, wherein the step (1) comprises a sub-step (1-1) of inputting the position coordinate of the at least one correction point into the neural network model so as to allow the neural network model to output a first direction coordinate correction amount, and inputting the position coordinate of the at least one correction point into the neural network model so as to allow the neural network model to output a second direction coordinate correction amount, wherein a first direction sum coordinate is obtained after the first direction coordinate correction amount and the position coordinate of the at least one correction point are added together, and a second direction sum coordinate is obtained after the second direction coordinate correction amount and the position coordinate of the at least one correction point are added together, wherein in the step (2), a pixel value of the original image corresponding to the first direction sum coordinate and the second direction sum coordinate is used as the pixel value of the at least one correction point.

19. The image distortion correction method according to claim 18,
    wherein the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively; or
    wherein the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

20. The image distortion correction method according to claim 15, wherein the neural network model comprises an input layer, a hidden layer and an output layer, and the hidden layer comprises plural neurons, wherein a transfer function of each neuron of the hidden layer is a non-linear function, wherein the first direction coordinate correction amount is outputted from the neural network model at least according to a first direction parameter group corresponding to at least one neuron of the hidden layer, and the second direction coordinate correction amount is outputted from the neural network model at least according to a second direction parameter group corresponding to the at least one neuron of the hidden layer, wherein the first direction parameter group comprises a first horizontal direction coordinate weight, a first vertical direction coordinate weight and a first direction bias value, and the second direction parameter group comprises a second horizontal direction coordinate weight, a second vertical direction coordinate weight and a second direction bias value.

21. The image distortion correction method according to claim 20, wherein the hidden layer comprises four neurons.

22. An image distortion correction device for performing a correcting operation on an original image so as to obtain a correction image with plural correction points, the image distortion correction device comprising:
a data storage and control unit for obtaining a position coordinate of each correction point, a first direction parameter group and a second direction parameter group;
a neural network computing unit connected with the data storage and control unit for generating and outputting a first direction correction point parameter of each correction point according to the position coordinate of each correction point and the first direction parameter group, and generating and outputting a second direction correction point parameter of each correction point according to the position coordinate of each correction point and the second direction parameter group; and
a pixel value computing unit connected with the neural network computing unit for obtaining a pixel value of each correction point from the original image according to the first direction correction point parameter and the second direction correction point parameter of each correction point.

23. The image distortion correction device according to claim 22, wherein the first direction correction point parameter is a first direction coordinate correction amount, and the second direction correction point parameter is a second direction coordinate correction amount.

24. The image distortion correction device according to claim 23, wherein a first direction sum coordinate is obtained after the first direction coordinate correction amount and the position coordinate of each correction point are added together, and a second direction sum coordinate is obtained after the second direction coordinate correction amount and the position coordinate of each correction point are added together, wherein the pixel value of each correction point is obtained from the original image by the pixel value computing unit according to the first direction sum coordinate and the second direction sum coordinate of each correction point.

25. The image distortion correction device according to claim 24, wherein the pixel value computing unit comprises an interpolation unit for interpolating pixel values of plural neighboring points around the first direction sum coordinate and the second direction sum coordinate of the original image, thereby obtaining the pixel value of each correction point.

26. The image distortion correction device according to claim 24,
wherein the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively; or wherein the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

27. The image distortion correction device according to claim 22, wherein the neural network computing unit comprises plural hidden layer neuron computing units, wherein each of the hidden layer neuron computing unit comprises an input computing unit and a transfer function computing unit, wherein the first direction parameter group comprises a first horizontal direction coordinate weight, a first vertical direction coordinate weight and a first direction bias value corresponding to at least one hidden layer neuron computing unit of the neural network computing unit, and the second direction parameter group comprises a second horizontal direction coordinate weight, a second vertical direction coordinate weight and a second direction bias value corresponding to the at least one hidden layer neuron computing unit of the neural network computing unit.

28. The image distortion correction device according to claim 27, wherein the input computing unit is an index computing unit, and the transfer function computing unit is a non-linear function computing unit, wherein after the position coordinate of each correction point is received by the index computing unit, the index computing unit generates and outputs an index value to the non-linear function computing unit, and/or the plural hidden layer neuron computing units comprise four hidden layer neuron computing units, or the plural hidden layer neuron computing units comprise four first direction hidden layer neuron computing units and four second direction hidden layer neuron computing units.

29. The image distortion correction device according to claim 28, wherein the non-linear function computing unit comprises an integer index function computing unit, a decimal fraction index function computing unit, and a multiplication and integration computing unit connected with the integer index function computing unit and the decimal fraction index function computing unit, wherein the index value is divided into an integer index value and a decimal fraction index value, wherein the integer index function computing unit receives the integer index value and generates an integer index function value, the decimal fraction index function computing unit receives the decimal fraction index value and generates a decimal fraction index function value, and the multiplication and integration computing unit receives the integer index function value and the decimal fraction index function value and generates a product of the integer index function value and the decimal fraction index function value.

30. The image distortion correction device according to claim 29, wherein the integer index function computing unit has an integer index function table, wherein after the integer index value is received by the integer index function computing unit, the integer index function computing unit generates and outputs the integer index function value according to the coordinate rotation table.

31. The image distortion correction device according to claim 29,
wherein the decimal fraction index function computing unit comprises a coordinate rotation digital computer (CORDIC) for performing an index computation after the decimal fraction index value is received by the decimal fraction index function computing unit; or wherein the decimal fraction index function computing unit has a decimal fraction index function table, and the decimal fraction index function computing unit generates and outputs the decimal fraction index function value according to the decimal fraction index function table after the decimal fraction index value is received by the decimal fraction index function computing unit; or wherein the decimal fraction index function computing unit generates and outputs the decimal fraction index function value according to a Taylor series expansion after the decimal fraction index value is received by the decimal fraction index function computing unit; or wherein the decimal fraction index function computing unit has the decimal fraction index function table, and the decimal fraction index function computing unit generates and outputs the decimal fraction index function value according to the decimal fraction index function table and the Taylor series expansion after the decimal fraction index value is received by the decimal fraction index function computing unit; or wherein the decimal fraction index function computing unit comprises the coordinate rotation digital computer (CORDIC) and the decimal fraction index function table, and the decimal fraction index function computing unit generates and outputs the decimal fraction index function value according to the index computation of the coordinate rotation digital computer (CORDIC) and the decimal fraction index function table.

32. The image distortion correction device according to claim 31, wherein if the decimal fraction index value is smaller than a predetermined value, the coordinate rotation digital computer performs the index computation to obtain the decimal fraction index function value, wherein if the decimal fraction index value is larger than the predetermined value, the decimal fraction index function computing unit generates and outputs the decimal fraction index function value according to the decimal fraction index function table.

33. The image distortion correction device according to claim 22, wherein the image distortion correction device is included in an image pickup device or an image projection device, and/or the image distortion correction device is implemented by a field-programmable gate array (FPGA) or a very-large-scale integration (VLSI) circuit.

34. An image distortion correction device for performing a correcting operation on an original image so as to obtain a correction image with plural correction points, the image distortion correction device comprising:
a data storage and control unit for obtaining a position coordinate of each correction point and a direction parameter group;
a neural network computing unit connected with the data storage and control unit for generating and outputting a coordinate correction amount of each correction point according to the position coordinate of each correction point and the direction parameter group;
an arithmetic computing unit connected with the neural network computing unit for performing an arithmetic operation on the position coordinate of each correction point and the corresponding coordinate correction amount, thereby obtaining an arithmetic coordinate of each correction point; and
a pixel value computing unit connected with the arithmetic computing unit for obtaining a pixel value of each correction point from the original image according to the arithmetic coordinate.

35. The image distortion correction device according to claim 34, wherein the arithmetic operation is an addition operation, and the arithmetic coordinate is a sum coordinate.

36. The image distortion correction device according to claim 35, wherein the direction parameter group comprises a first direction parameter group and a second direction parameter group, the coordinate correction amount of each correction point comprises a first direction coordinate correction amount and a second direction coordinate correction amount, and the sum coordinate comprises a first direction sum coordinate and a second direction sum coordinate, wherein the neural network computing unit generates and outputs the first direction coordinate correction amount of each correction point according to the position coordinate of each correction point and the first direction parameter group, and generates and outputs a second direction coordinate correction amount of each correction point according to the position coordinate of each correction point and the second direction parameter group, wherein the first direction sum coordinate is obtained after the first direction coordinate correction amount and the position coordinate of each correction point are added together, and the second direction sum coordinate is obtained after the second direction coordinate correction amount and the position coordinate of each correction point are added together.

37. The image distortion correction device according to claim 36, wherein the pixel value computing unit comprises an interpolation unit for interpolating pixel values of plural neighboring points around the first direction sum coordinate and the second direction sum coordinate of the original image, thereby obtaining the pixel value of each correction point.

38. The image distortion correction device according to claim 36,
wherein the first direction coordinate correction amount and the second direction coordinate correction amount are a horizontal direction coordinate correction amount and a vertical direction coordinate correction amount, respectively, and the first direction sum coordinate and the second direction sum coordinate are a horizontal direction sum coordinate and a vertical direction sum coordinate, respectively; or
wherein the first direction coordinate correction amount and the second direction coordinate correction amount are the vertical direction coordinate correction amount and the horizontal direction coordinate correction amount, respectively, and the first direction sum coordinate and the second direction sum coordinate are the vertical direction sum coordinate and the horizontal direction sum coordinate, respectively.

39. The image distortion correction device according to claim 36, wherein the neural network computing unit comprises plural hidden layer neuron computing units, wherein each of the hidden layer neuron computing unit comprises an input computing unit and a transfer function computing unit, wherein the first direction parameter group comprises a first horizontal direction coordinate weight, a first vertical direction coordinate weight and a first direction bias value corresponding to at least one hidden layer neuron computing unit of the neural network computing unit, and the second direction parameter group comprises a second horizontal direction coordinate weight, a second vertical direction coordinate weight and a second direction bias value corresponding to the at least one hidden layer neuron computing unit of the neural network computing unit.

40. The image distortion correction device according to claim 39, wherein the input computing unit is an index computing unit, and the transfer function computing unit is a non-linear function computing unit, wherein after the position coordinate of each correction point is received by the index computing unit, the index computing unit generates and outputs an index value to the non-linear function computing unit, and/or the plural hidden layer neuron computing units comprise four hidden layer neuron computing units, or the plural hidden layer neuron computing units comprise four first direction hidden layer neuron computing units and four second direction hidden layer neuron computing units.

41. The image distortion correction device according to claim 40, wherein the non-linear function computing unit comprises an integer index function computing unit, a decimal fraction index function computing unit, and a multiplication and integration computing unit connected with the integer index function computing unit and the decimal fraction index function computing unit, wherein the index value is divided into an integer index value and a decimal fraction index value, wherein the integer index function computing unit receives the integer index value and generates an integer index function value, the decimal fraction index function computing unit receives the decimal fraction index value and generates a decimal fraction index function value, and the multiplication and integration computing unit receives the integer index function value and the decimal fraction index function value and generates a product of the integer index function value and the decimal fraction index function value.

42. The image distortion correction device according to claim 41, wherein the integer index function computing unit has an integer index function table, wherein after the integer index value is received by the integer index function computing unit, the integer index function computing unit generates and outputs the integer index function value according to the coordinate rotation table.

43. The image distortion correction device according to claim 41,
wherein the decimal fraction index function computing unit comprises a coordinate rotation digital computer (CORDIC) for performing an index computation after the decimal fraction index value is received by the decimal fraction index function computing unit; or
wherein the decimal fraction index function computing unit has a decimal fraction index function table, and the decimal fraction index function computing unit generates and outputs the decimal fraction index function value according to the decimal fraction index function table after the decimal fraction index value is received by the decimal fraction index function computing unit; or
wherein the decimal fraction index function computing unit generates and outputs the decimal fraction index function value according to a Taylor series expansion after the decimal fraction index value is received by the decimal fraction index function computing unit; or
wherein the decimal fraction index function computing unit has the decimal fraction index function table, and the decimal fraction index function computing unit generates and outputs the decimal fraction index function value according to the decimal fraction index function table and the Taylor series expansion after the decimal fraction index value is received by the decimal fraction index function computing unit; or
wherein the decimal fraction index function computing unit comprises the coordinate rotation digital computer (CORDIC) and the decimal fraction index function table, and the decimal fraction index function computing unit generates and outputs the decimal fraction index function value according to the index computation of the coordinate rotation digital computer (CORDIC) and the decimal fraction index function table.

44. The image distortion correction device according to claim 43, wherein if the decimal fraction index value is smaller than a predetermined value, the coordinate rotation digital computer performs the index computation to obtain the decimal fraction index function value, wherein if the decimal fraction index value is larger than the predetermined value, the decimal fraction index function computing unit generates and outputs the decimal fraction index function value according to the decimal fraction index function table.

45. The image distortion correction device according to claim 34, wherein the image distortion correction device is included in an image pickup device or an image projection device, and/or the image distortion correction device is implemented by a field-programmable gate array (FPGA) or a very-large-scale integration (VLSI) circuit.

* * * * *